United States Patent [19]

Poole

[11] Patent Number: 5,276,868
[45] Date of Patent: Jan. 4, 1994

[54] METHOD AND APPARATUS FOR POINTER COMPRESSION IN STRUCTURED DATABASES

[75] Inventor: Nigel T. Poole, Natick, Mass.

[73] Assignee: Digital Equipment Corp., Maynard, Mass.

[21] Appl. No.: 527,493

[22] Filed: May 23, 1990

[51] Int. Cl.⁵ .............................................. G06F 15/40
[52] U.S. Cl. ................................. 395/600; 364/715.02; 364/DIG. 1; 364/251.6; 364/282.1; 364/282.3
[58] Field of Search ............... 364/DIG. 1, DIG. 2; 395/400, 425, 395/600, 725; 365, 715.02, 715.03

[56] References Cited

U.S. PATENT DOCUMENTS

| | | | |
|---|---|---|---|
| 3,593,309 | 7/1971 | Clark et al. | 364/419 |
| 4,507,752 | 3/1985 | McKenna et al. | 395/775 |
| 4,817,036 | 3/1989 | Millett et al. | 395/600 |
| 5,105,353 | 4/1992 | Charles et al. | 395/700 |

OTHER PUBLICATIONS

Algorithms for Trie Compaction, Ai-Suwaiyel, ACM Transactions on Database Systems, vol. 9, No. 2, Jun. 1984, pp. 243–263.
Efficient On-Line Construction and Correction of Position Trees, Majster et al., Siam J. Computing, vol. 9, No. 4, Nov. 1980.

*Primary Examiner*—Paul V. Kulik
*Assistant Examiner*—John C. Loomis
*Attorney, Agent, or Firm*—Arnold, White & Durkee

[57] ABSTRACT

A method and apparatus for addressing compressed nodes in a database structure is disclosed in which each compressed node is associated with a particular mapping function and each element in the node is assigned a particular identification code. The character to be searched is converted into a physical address having a first portion which is used to index to a particular element in a compressed node, and a second portion which is used to verify that the selected element corresponds to the search character.

9 Claims, 29 Drawing Sheets

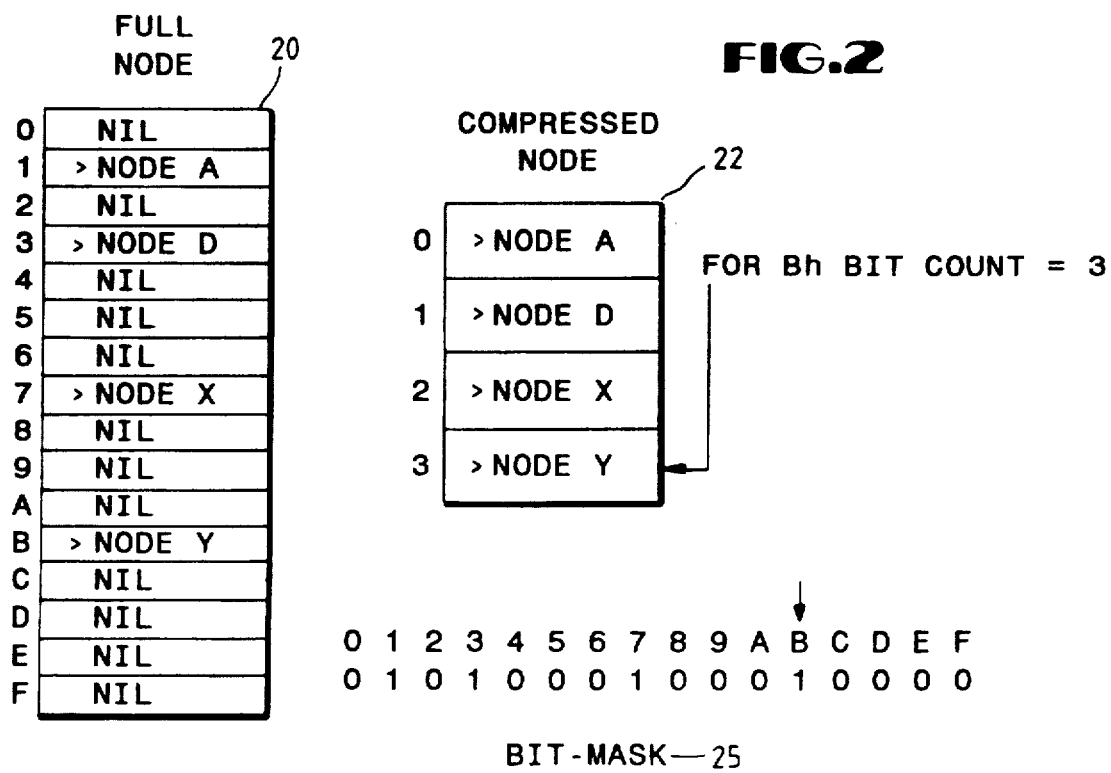
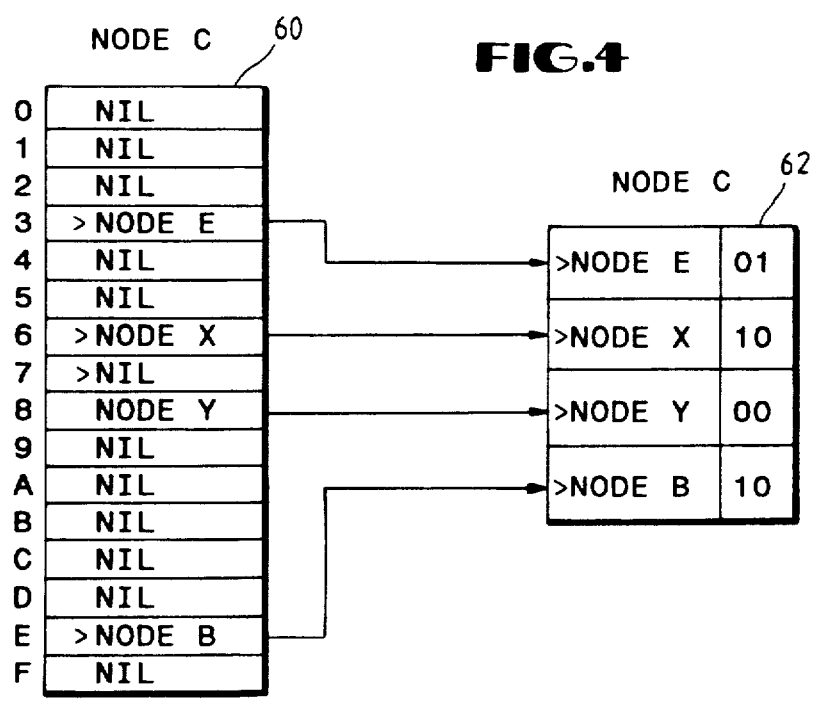

FIG.3A

| NODE-TYPE | TRANSLATION MATRIX |
|---|---|
| 0001 | 0 3 4 7<br>2 1 6 5<br>8 B C F<br>A 9 E D |
| 0010 | 0 A 4 E<br>1 B 5 F<br>8 2 C 6<br>9 3 D 7 |
| 0011 | 0 7 8 F<br>2 5 A D<br>4 3 C B<br>6 1 E 9 |
| 0100 | 0 9 6 F<br>4 D 2 B<br>8 1 E 7<br>C 5 A 3 |
| 0101 | 0 B 4 F<br>2 9 6 D<br>8 3 C 7<br>A 1 E 5 |
| 0110 | 0 A C 6<br>1 B D 7<br>8 2 4 E<br>9 3 5 F |

FIG.3B

| NODE-TYPE | TRANSLATION MATRIX |
|---|---|
| 0111 | 0 1 2 3<br>4 5 6 7<br>8 9 A B<br>C D E F |
| 1000 | 0 1 8 9<br>2 3 A B<br>4 5 C D<br>6 7 E F |
| 1001 | 0 2 C E<br>1 3 D F<br>4 6 8 A<br>5 7 9 B |
| 1010 | 0 5 2 7<br>4 1 6 3<br>8 D A F<br>C 9 E B |
| 1011 | 0 1 C D<br>2 3 E F<br>4 5 8 9<br>6 7 A B |
| 1100 | 0 5 8 D<br>2 7 A F<br>4 1 C 9<br>6 3 E B |

FIG. 3C

| NODE-TYPE | TRANSLATION MATRIX |
|---|---|
| 1101 | 0 9 A 3<br>4 D E 7<br>8 1 2 B<br>C 5 6 F |
| 1110 | 0 D 6 B<br>4 9 2 F<br>8 5 E 3<br>C 1 A 7 |
| 1111 | 0 5 E B<br>4 1 A F<br>8 D 6 3<br>C 9 2 7 |

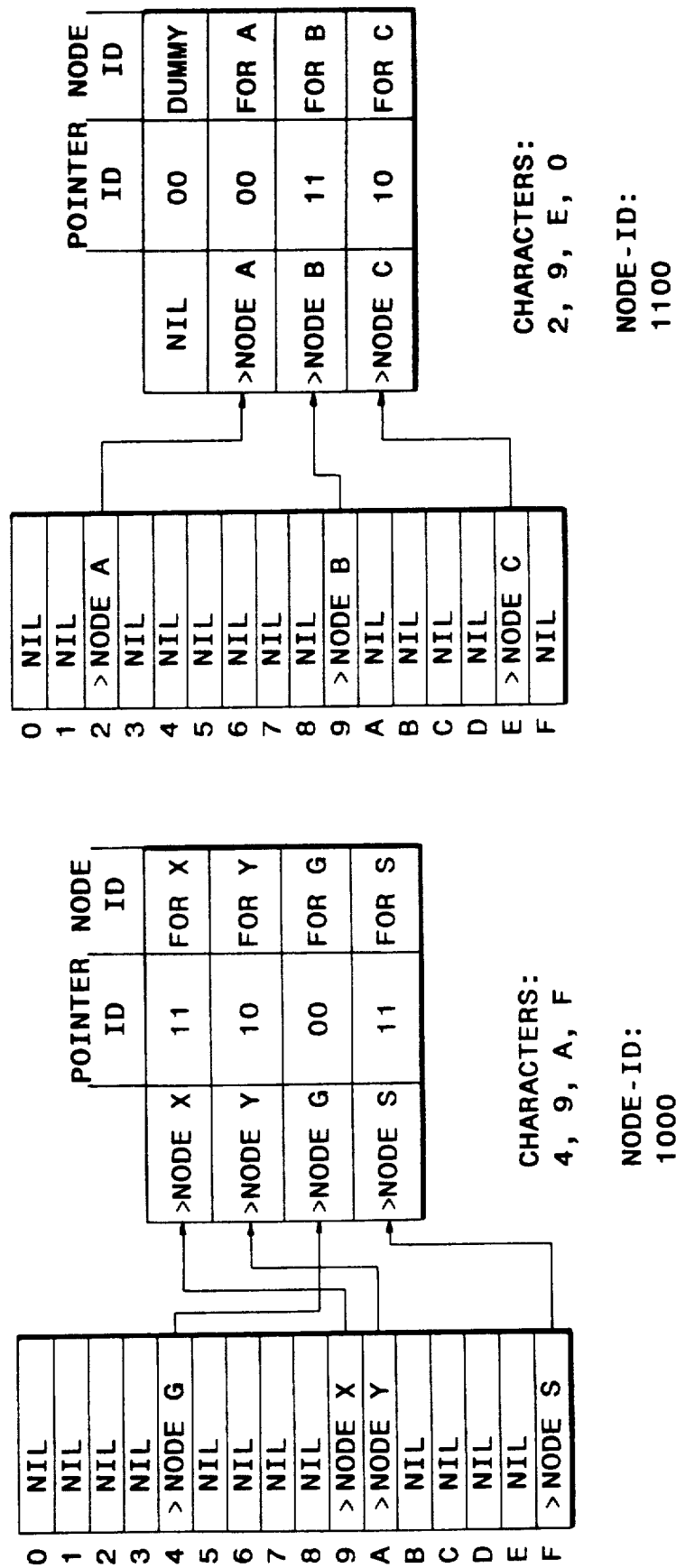

FIG.9A

| NODE-TYPE | TRANSLATION MATRIX | HASHING MATRIX |
|---|---|---|
| 0001 | 0 3 4 7<br>2 1 6 5<br>8 B C F<br>A 9 E D | 1 0 0 0<br>0 0 1 1<br>0 1 0 0<br>0 0 0 1 |
| 0010 | 0 A 4 E<br>1 B 5 F<br>8 2 C 6<br>9 3 D 7 | 1 0 1 0<br>0 0 0 1<br>0 1 0 0<br>0 0 1 0 |
| 0011 | 0 7 8 F<br>2 5 A D<br>4 3 C B<br>6 1 E 9 | 0 1 0 1<br>0 0 1 1<br>1 0 0 0<br>0 0 0 1 |
| 0100 | 0 9 6 F<br>4 D 2 B<br>8 1 E 7<br>C 5 A 3 | 1 0 0 1<br>0 1 1 0<br>0 0 1 0<br>0 0 0 1 |
| 0101 | 0 B 4 F<br>2 9 6 D<br>8 3 C 7<br>A 1 E 5 | 1 0 0 1<br>0 0 1 1<br>0 1 0 0<br>0 0 0 1 |
| 0110 | 0 A C 6<br>1 B D 7<br>8 2 4 E<br>9 3 5 F | 1 1 1 0<br>0 0 0 1<br>0 1 0 0<br>0 0 1 0 |

FIG. 9B

| NODE-TYPE | TRANSLATION MATRIX | HASHING MATRIX |
|---|---|---|
| 0111 | 0 1 2 3<br>4 5 6 7<br>8 9 A B<br>C D E F | 1 0 0 0<br>0 1 0 0<br>0 0 1 0<br>0 0 0 1 |
| 1000 | 0 1 8 9<br>2 3 A B<br>4 5 C D<br>6 7 E F | 0 1 0 0<br>0 0 1 0<br>1 0 0 0<br>0 0 0 1 |
| 1001 | 0 2 C E<br>1 3 D F<br>4 6 8 A<br>5 7 9 B | 1 1 0 0<br>0 0 0 1<br>1 0 0 0<br>0 0 1 0 |
| 1010 | 0 5 2 7<br>4 1 6 3<br>8 D A F<br>C 9 E B | 1 0 0 0<br>0 1 0 1<br>0 0 1 0<br>0 0 0 1 |
| 1011 | 0 1 C D<br>2 3 E F<br>4 5 8 9<br>6 7 A B | 1 1 0 0<br>0 0 1 0<br>1 0 0 0<br>0 0 0 1 |
| 1100 | 0 5 8 D<br>2 7 A F<br>4 1 C 9<br>6 3 E B | 0 1 0 1<br>0 0 1 0<br>1 0 0 0<br>0 0 0 1 |

FIG. 9C

| NODE-TYPE | TRANSLATION MATRIX | HASHING MATRIX |
|---|---|---|
| 1101 | 0 9 A 3<br>4 D E 7<br>8 1 2 B<br>C 5 6 F | 1 0 1 1<br>0 1 0 0<br>0 0 1 0<br>0 0 0 1 |
| 1110 | 0 D 6 B<br>4 9 2 F<br>8 5 E 3<br>C 1 A 7 | 1 0 0 1<br>0 1 1 1<br>0 0 1 0<br>0 0 0 1 |
| 1111 | 0 5 E B<br>4 1 A F<br>8 D 6 3<br>C 9 2 7 | 1 0 1 0<br>0 1 1 1<br>0 0 1 0<br>0 0 0 1 |

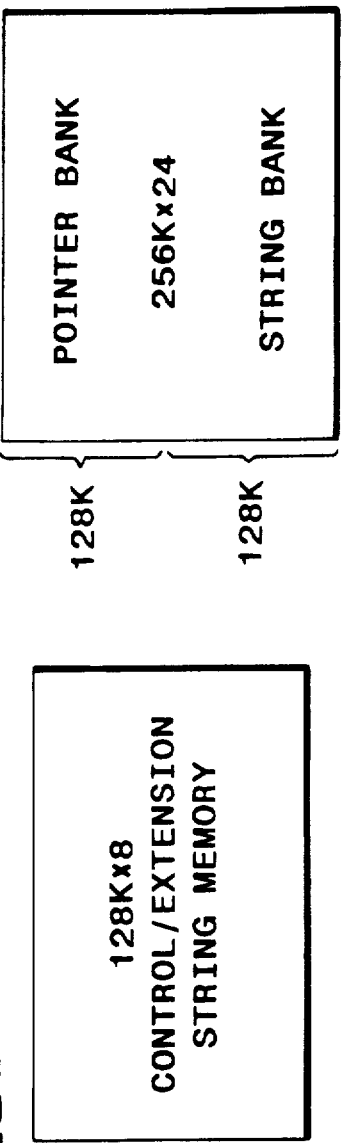

FIG. 13A

| NODE A (ROOT NODE) | |
|---|---|
| 0 | >LEAF |
| 1 | >LEAF |
| 2 | >LEAF |
| 3 | NIL |
| 4 | NIL |
| 5 | NIL |
| 6 | >NODE C |
| 7 | NIL |
| 8 | NIL |
| 9 | NIL |
| A | NIL |
| B | NIL |
| C | NIL |
| D | NIL |
| E | >NODE B |
| F | NIL |

| NODE B | |
|---|---|
| 0 | NIL |
| 1 | NIL |
| 2 | NIL |
| 3 | NIL |
| 4 | NIL |
| 5 | NIL |
| 6 | NIL |
| 7 | >NODE F |
| 8 | NIL |
| 9 | NIL |
| A | >NODE D |
| B | NIL |
| C | NIL |
| D | NIL |
| E | NIL |
| F | NIL |

| NODE C | |
|---|---|
| 0 | NIL |
| 1 | NIL |
| 2 | NIL |
| 3 | >NODE G |
| 4 | NIL |
| 5 | NIL |
| 6 | NIL |
| 7 | NIL |
| 8 | NIL |
| 9 | NIL |
| A | NIL |
| B | NIL |
| C | NIL |
| D | >NODE E |
| E | NIL |
| F | NIL |

ENTRIES (HEX REPRESENTATION)

633
634
6D0
6D5
E76
E7B
EA4
EAB

FIG. 13B1

NODE A

| | |
|---|---|
| 0 | >LEAF 1 |
| 1 | >LEAF 2 |
| 2 | >LEAF |
| 3 | NIL |
| 4 | NIL |
| 5 | NIL |
| 6 | >NODE C |
| 7 | NIL |
| 8 | NIL |
| 9 | NIL |
| A | NIL |
| B | NIL |
| C | NIL |
| D | NIL |
| E | >NODE B |
| F | NIL |

NODE B

| | |
|---|---|
| 0 | NIL |
| 1 | NIL |
| 2 | NIL |
| 3 | NIL |
| 4 | NIL |
| 5 | NIL |
| 6 | NIL |
| 7 | >NODE E |
| 8 | NIL |
| 9 | NIL |
| A | >NODE D |
| B | NIL |
| C | NIL |
| D | NIL |
| E | NIL |
| F | NIL |

NODE C

| | |
|---|---|
| 0 | NIL |
| 1 | NIL |
| 2 | NIL |
| 3 | >NODE G |
| 4 | NIL |
| 5 | NIL |
| 6 | NIL |
| 7 | NIL |
| 8 | NIL |
| 9 | NIL |
| A | NIL |
| B | NIL |
| C | NIL |
| D | >NODE F |
| E | NIL |
| F | NIL |

NODE D

| | |
|---|---|
| 0 | NIL |
| 1 | NIL |
| 2 | NIL |
| 3 | NIL |
| 4 | >LEAF 3 |
| 5 | NIL |
| 6 | NIL |
| 7 | NIL |
| 8 | NIL |
| 9 | NIL |
| A | NIL |
| B | >LEAF 4 |
| C | NIL |
| D | NIL |
| E | NIL |
| F | NIL |

FIG.13B2

| | NODE E |
|---|---|
| 0 | NIL |
| 1 | NIL |
| 2 | NIL |
| 3 | NIL |
| 4 | NIL |
| 5 | NIL |
| 6 | >LEAF 5 |
| 7 | NIL |
| 8 | NIL |
| 9 | NIL |
| A | NIL |
| B | >LEAF 6 |
| C | NIL |
| D | NIL |
| E | NIL |
| F | NIL |

| | NODE F |
|---|---|
| 0 | >LEAF 7 |
| 1 | NIL |
| 2 | NIL |
| 3 | NIL |
| 4 | NIL |
| 5 | >LEAF 8 |
| 6 | NIL |
| 7 | NIL |
| 8 | NIL |
| 9 | NIL |
| A | NIL |
| B | NIL |
| C | NIL |
| D | NIL |
| E | NIL |
| F | NIL |

| | NODE G |
|---|---|
| 0 | NIL |
| 1 | NIL |
| 2 | >NIL |
| 3 | >LEAF 9 |
| 4 | LEAF 10 |
| 5 | NIL |
| 6 | NIL |
| 7 | NIL |
| 8 | NIL |
| 9 | NIL |
| A | NIL |
| B | NIL |
| C | NIL |
| D | NIL |
| E | NIL |
| F | NIL |

ENTRIES
(HEX REPRESENTATION)

633
634
6D0
6D5
E76
E7B
EA4
EAB
0
1
2

FIG.13C1

| | NODE A | |
|---|---|---|
| 0 | >LEAF | - |
| 1 | >LEAF | - |
| 2 | >LEAF | - |
| 3 | NIL | - |
| 4 | NIL | - |
| 5 | NIL | - |
| 6 | >NODE C | 0100 |
| 7 | NIL | - |
| 8 | NIL | - |
| 9 | NIL | - |
| A | NIL | - |
| B | NIL | - |
| C | NIL | - |
| D | NIL | - |
| E | >NODE B | 1001 |
| F | NIL | - |

NODE B

| POINTER | ID | NODE ID (NEXT) |
|---|---|---|
| NIL | 00 | - |
| NIL | 00 | - |
| >NODE D | 11 | 1001 |
| >NODE E | 01 | 1001 |

NODE C

| POINTER | ID | NODE ID (NEXT) |
|---|---|---|
| NIL | 00 | - |
| >NODE F | 01 | 0100 |
| NIL | 01 | - |
| >NODE G | 11 | 0100 |

NODE D

| POINTER | ID | NODE ID (NEXT) |
|---|---|---|
| NIL | 00 | - |
| NIL | 00 | - |
| >LEAF 3 | 00 | - |
| >LEAF 4 | 11 | - |

NODE E

| POINTER | ID | NODE ID (NEXT) |
|---|---|---|
| NIL | 00 | - |
| NIL | 00 | - |
| >LEAF 5 | 01 | - |
| >LEAF 6 | 11 | - |

NODE F

| POINTER | ID | NODE ID (NEXT) |
|---|---|---|
| >LEAF 7 | 00 | - |
| NIL | 10 | - |
| NIL | 01 | - |
| >LEAF 8 | 01 | - |

NODE G

| POINTER | ID | NODE ID (NEXT) |
|---|---|---|
| NIL | 00 | - |
| >LEAF10 | 00 | - |
| NIL | 01 | - |
| >LEAF 9 | 11 | - |

NODE B:
CHARACTERS: 7, A, 0, 1̲ (DUMMY)
NODE-ID: 1001

NODE C:
CHARACTERS: 3, D, 0, 1̲ (DUMMY)
NODE-ID: 0100

NODE D:
CHARACTERS: 4, B, 0, 1̲ (DUMMY)
NODE-ID: 1001

NODE E:
CHARACTERS: 6, B, 0, 1̲ (DUMMY)
NODE-ID: 1001

NODE F:
CHARACTERS: 0, 5, 1, 2̲ (DUMMY)
NODE-ID: 0100

NODE G:
CHARACTERS: 3, 4, 0, 1̲ (DUMMY)
NODE-ID: 0100

| P | S | PTR-ID | TN | POINTER | NODE-TYPE |
|---|---|--------|----|---------|-----------|

P - (1 BIT) PARITY.
S - (1 BIT) IF SET, INDICATES PATH COMPRESSION STRING STORED AT NEXT NODE.
PTR-ID - (2 BITS) AT A 4-NODE, THE TWO COLUMN ADDRESS BITS OF THE HASHED DIGIT CORRESPONDING TO THIS POINTER. AT A 16-NODE, THESE BITS ARE IRRELEVANT.

TN - (1 BIT) MOST SIGNIFICANT NEXT-NODE ADDRESS BIT. IF SET, INDICATES THAT THE NEXT NODE IS A TERMINAL NODE.

POINTER - (15 BITS) LEAST SIGNIFICANT ADDRESS BITS OF THE NEXT NODE.
- (4 BITS) INDICATES WHICH OF 15 HASH FUNCTIONS IS USED AT THE NEXT NODE, IF THE VALUE IS NON-ZERO. IF THE NODE-TYPE IS EQUAL TO ZERO, THE NEXT NODE IS A 16-NODE.

NOTE : (i) NODES WITH ADDRESSES 0000 THROUGH 07ff (2K OF 4-NODES, 512 16-NODES) ARE INTERPRETED AS NIL-NODES; POINTERS (TN-POINTER) WITH VALUES IN THIS RANGE ARE NIL-POINTERS.
(ii) WHEN A 16-NODE IS INDICATED BY A NODE-TYPE OF ZERO, THE TWO LEAST SIGNIFICANT BITS OF THE POINTER SHOULD BE ZERO.
(iii) IF THE POINTER INDICATES THAT THE NEXT NODE IS TERMINAL OR NIL, THEN THE NODE-TYPE IS IRRELEVANT.

FIG.15B2

(i) NON LOADING NODES :

| P | O | SR | AM | DIGIT 5 |
|---|---|----|----|---------|

(ii) LOADING-NODES :

| P | 1 | IDI-LENGTH |
|---|---|------------|

P - (1 BIT) PARITY

SR - (1 BIT) SAVE RESULT : IF SET, INDICATES THAT THE ADDRESS OF THIS NODE SHOULD BE SAVED, SINCE IT REPRESENTS THE FINDING OF A PREFIX OR OF A COMPLETE RESULT.

AM - (1 BIT) AREA MATCH : IF SET, INDICATES THAT THE DIGITS OF THE SEARCH ARGUMENT PROCESSED SO FAR MATCH (ONE OF) THE AREAS THAT THIS ROUTER RESIDES IN. IF PRECISELY FOURTEEN DIGITS REMAIN TO BE PROCESSED, SEARCHING WILL CONTINUE FROM THE LEVEL-1 ROOT. (DECNET PHASE-V ADDRESSES ONLY).

DIGIT 5 - (4 BITS) ONE OF THE STRING DIGITS FORMING THE PATH COMPRESSION STRING, VALID ONLY IF THE PARENT NODE POINTER'S "S" BIT WAS SET

IDI-LENGTH - (6 BITS) LENGTH OF IDI TO LOAD INTO INTERNAL COUNTER (ISO NETWORK ADDRESSES ONLY).

NOTE : (i) FOR TRIES BUILT TO HANDLE ISO FORMAT NETWORK ADDRESSES, A LOADING-NODE SHOULD BE PLACED AS THE FIRST NODE REACHED AFTER PROCESSING THE AFI. THE AFI ALONE CANNOT BE USED TO REPRESENT A DECNET AREA, NOR CAN IT BE A VALID PREFIX - EXCEPT WHEN THE AFI INDICATES A NULL IDI.

FIG.15B3

| DIGIT 11 | DIGIT 12 |
|---|---|

DIGIT N - (4 BITS) TWELFTH AND THIRTEENTH DIGITS OF PATH COMPRESSION STRING, VALIDITY INDICATED BY "COUNT" FIELD IN SECOND STRING WORD.

FIG.15B4

B.3. THE FORMAT OF THE FIRST STRING WORD IS :

| P | COUNT | DIGIT 0 | DIGIT 1 | DIGIT 2 | DIGIT 3 | DIGIT 4 |
|---|---|---|---|---|---|---|

P - (1BIT) PARITY
COUNT - (3 BITS) NUMBER OF DIGITS STORED HERE :
        0 => UNDEFINED
        1..5 => ONE TO FIVE DIGITS
        6 => SIX DIGITS, SIXTH IS IN CONTROL WORD
        7 => SIX DIGITS: MORE STORED IN SECOND STRING WORD.

DIGIT N - (4 BITS) DIGITS GENERATED BY PATH COMPRESSION, VALIDITY INDICATED BY "COUNT" FIELD.

B.4. THE FORMAT OF THE SECOND STRING WORD IS :

| P | COUNT | DIGIT 6 | DIGIT 7 | DIGIT 8 | DIGIT 9 | DIGIT 10 |
|---|---|---|---|---|---|---|

P - (1 BIT) PARITY (SEE B.5 BELOW).
COUNT - (3 BITS) NUMBER OF DIGITS STORED HERE :
        0 => UNDEFINED
        1..5 => ONE TO FIVE DIGITS
        6..7 => SIX TO SEVEN DIGITS, SIXTH AND SEVENTH STORED IN EXTENSION WORD.

DIGIT N - (4 BITS) DIGITS GENERATED BY PATH COMPRESSION, VALIDITY INDICATED BY "COUNT" FIELD.

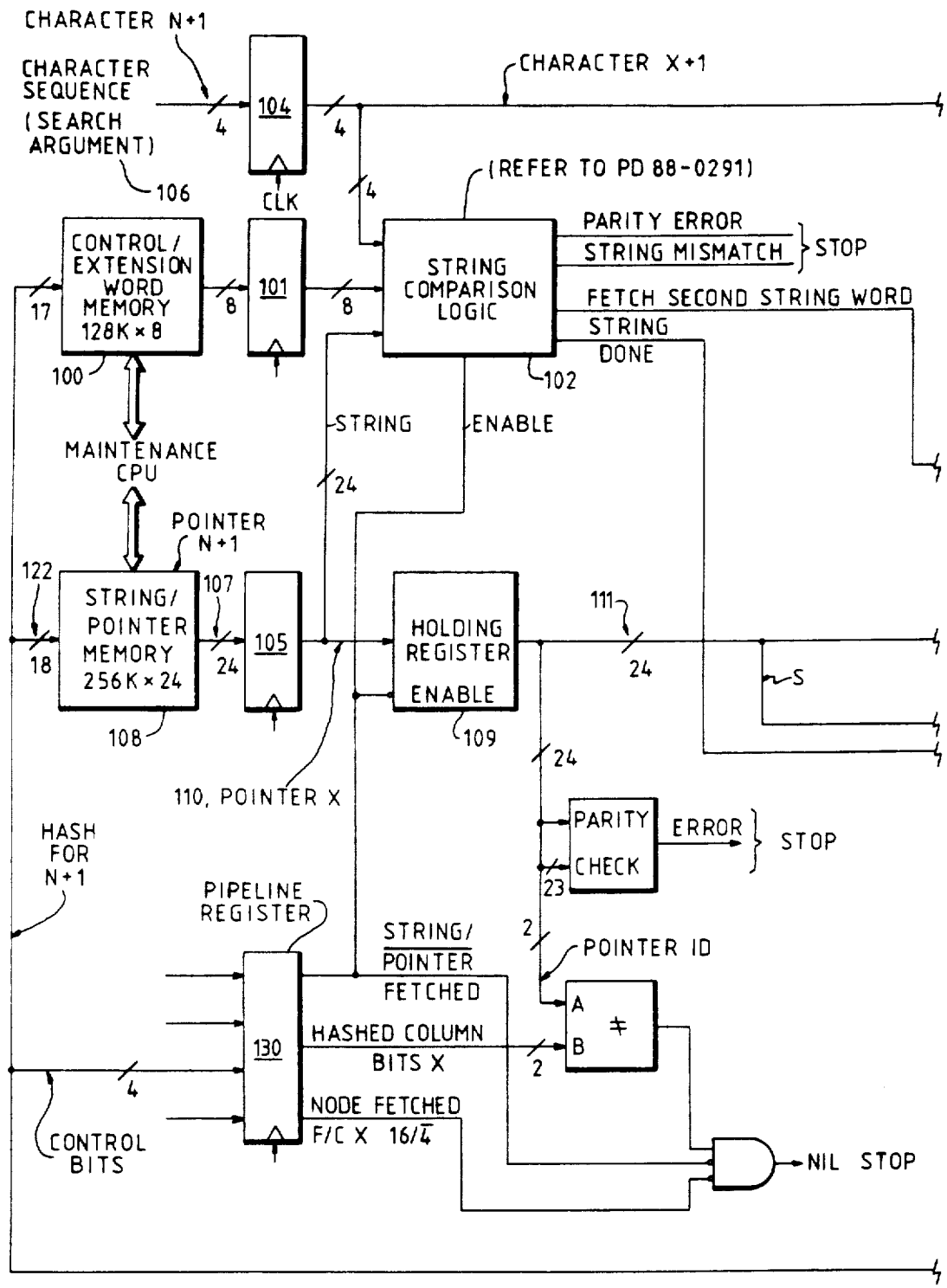
FIG.15F1

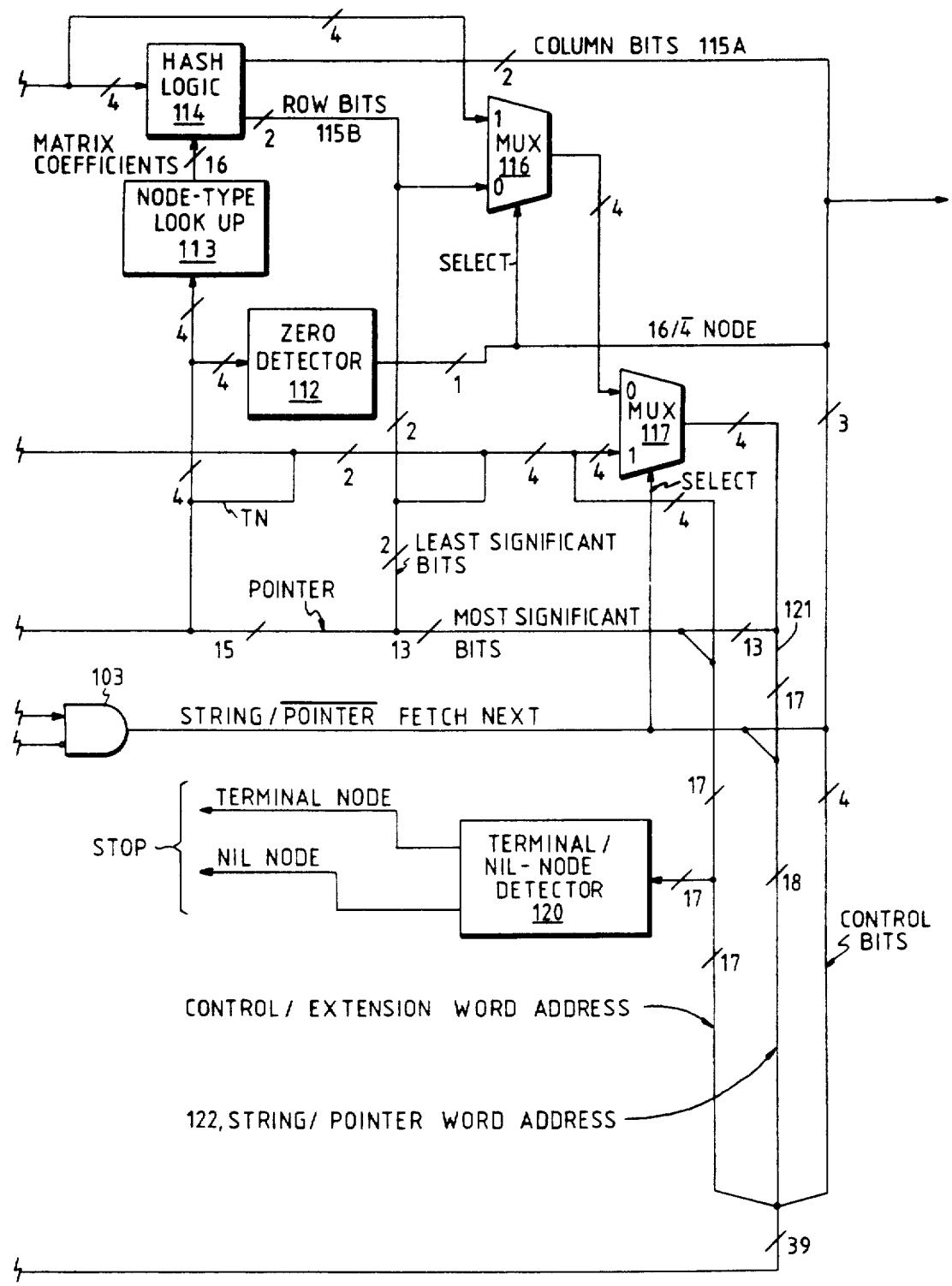
FIG.15 F2

METHOD AND APPARATUS FOR POINTER COMPRESSION IN STRUCTURED DATABASES

FIELD OF THE INVENTION

The present invention relates to an improved method and apparatus for performing pointer compression in structured databases.

BACKGROUND OF THE INVENTION

I. Database searches

A computerized database is a collection of information that is organized for ease of retrieval. Such databases are generally organized in a structured pattern. One such structure is known as a TRIE-structure.

In a traditional TRIE-structured database information is located through searches that employ TRIE-nodes. Such TRIE-nodes are supported by memory, and each contains a list, e.g., of sixteen elements, each element corresponds to one of sixteen possible characters.

Using such a TRIE-structure, string words of arbitrary length may be searched. First, the string word being searched is divided into several characters, each being four bits in length for the above example (i.e., a sixteen element node). Next, the first character of the word being searched is used to index into the first TRIE-node.

The element corresponding to the character being searched may be one of three types:

(1) The element may be a NODE pointer which points to another TRIE-node. A NODE pointer indicates that, as of the character being searched, an entry in the database matches the string word being searched. If a NODE pointer is found using the first character as an index into the first node, the second character in the string word is then used to index into the node referenced by the NODE pointer. If another NODE pointer is found, the process repeats, this time using the third character of the string word as an index.

(2) The second type of element which may be referenced in a node is a NIL or NULL pointer. A NIL pointer indicates that the database holds no entries that match the string being searched beyond this point. When a NIL pointer is found, the search stops.

(3) The third possible element in a node is a LEAF pointer. A LEAF pointer indicates that a match has been found with an element in the database, and that no more searching is required. A LEAF pointer marks the end of a successful search, and may point to the start of some other process.

A example of a search using a traditional TRIE-structured database is given in FIG. 1. FIG. 1 illustrates a traditional TRIE structured database (10). The TRIE-structure includes nodes A (11), B (13), C(15), and D (17). String word (00) is illustrated as an exemplary word to be searched. As may be seen, string word (00) is divided into four characters (01,02,03,04) each four bits in length.

The first character (01) is used to index into the first node, node A (11). Since the first character is 1110, or E in hexi-decimal (hereinafter Eh), the fifteenth element (12) is checked. In the example the element corresponding to Eh (12) contains a NODE pointer which points to node B (13). Thus, the search continues at node B.

The second character of the string word (02), Ah, is used to index into node B (13) where another node pointer is found. This pointer points to node C and thus the search continues at node C using the third character (03), 8h, of the search word. In node C, the element corresponding to 8h is a pointer to node D.

The process continues until at node D (17) a LEAVE pointer is found in the element corresponding to the fourth character (04), 3h. At this point the search is complete, and the process referenced by the LEAF pointer is begun.

Had the fourth character of the string word been a 0h, the element corresponding to 0h (18) would have been selected. Since a NIL pointer is located at this element, the search would have been terminated as there is no element in the database that matches such a string word.

Pointer Compression

As the example TRIE-structure illustrates, each node requires some amount of memory to support its 16 elements. Since many of these elements contain essentially useless information (i.e., NIL pointers), a substantial amount of memory space is wasted. For reasons of performance and economy, it is desirable to minimize the amount of memory required to support the TRIE-nodes.

To eliminate some of the wasted memory, prior art databases have used a method know as "pointer compression." In traditional pointer compression, the NIL-pointers of a particular node are eliminated by compressing the non-NIL pointers of that node into a contiguous list, or compressed node.

An example of such pointer compression is given in FIG. 2. There, a node (20) having 4 non-nil elements is compressed into a node (22) having only four, contiguous, non-nil elements. By using this method, a sixteen element node can be compressed into a node having from between 1 and 15 non-nil elements. As may be seen, the pointers from the full node are copied into the compressed node in the order that they are found in the full node.

Once a node is compressed, the elements in the node can no longer be directly indexed by the search characters. The search characters now represent a "logical" address (i.e., where the element would be if there were no compression), while the actual elements reside at a "physical" address (where the elements are located in memory).

To support pointer compression, some means of providing a logical to physical index translation are required. In the past, a sixteen bit "Bit-mask" has been used to perform such a translation.

The bit-mask is a sixteen bit code that provides information describing the node prior to compression. Once the full node is built, each element in the node is examined. Every non-NIL pointer in the node causes the corresponding bit in the bit-mask to be set to one. For the exemplary node (20) in FIG. 2 the bits for element 1h, 3h, 7h, and Bh would all be set to one since non-nil pointers correspond to these indexes. Such a bit-mask is illustrated as bit-mask (25).

When a search is made on such a compressed database, the search character of the string now serves as an, index into the bit-mask, not into the node. The corresponding bit element in the bit mask is then examined. If it is a 0, then the corresponding pointer is NIL (i.e., not present); if the bit is a 1 then a non-nil pointer at the node corresponds to the character presented.

To access the correct pointer, one of two methods may be used. In the first method, a count is made of all the 1's that are set with an index lower than the bit of interest. This count provides the number of pointers that are physically present at the node which are listed before the pointer of interest. In this manner, the count provides an index into the compressed node.

In the second method, the sixteen bit mask is combined with the four bit search character, and this 20 bit code is used to address an element in a look-up table.

This type of pointer compression is better explained by reference to FIG. 2. For example, if the character to be searched at compressed node (22) is Bh, the bit corresponding to Bh will be examined in bit-mask (25). Since the bit is a 1, a non-nil pointer is present and following the first method a count will be made of all of the bits with an index of less than Bh. (Alternately a look-up table could be used) This count, three, will be used as an index into the compressed mode where the fourth pointer (element 3) will be located. In this manner the logical address may be converted into the physical address.

This method of pointer compression has several drawbacks. First, the hardware, or software required to implement the counting is oftentimes too slow for high-speed applications. Alternatively, the faster look-up table requires a large amount of memory (2**20 or 1 Meg.) This extra-memory (to support the bit-mask) may offset the memory gain realized by using pointer compression.

SUMMARY OF THE INVENTION

The present invention provides a method and apparatus for eliminating wasteful NIL-pointers through pointer compression while providing high-speed logical to physical index translation. The present invention effects such a translation at a faster speed, and with less memory use than prior art systems.

In contrast to the sixteen bit bit-mask, the present invention utilizes a four bit NODE-TYPE and a two bit POINTER-ID to accomplish the logical to physical translation.

Not all NIL pointers are removed in the present invention, only most of them. It has been found with the invention that complete pointer compression does not necessarily give any advantage over partial compression. In particular, it has now been demonstrated that there is no point in compressing a node to any size other than a power of two.

Since total compression is not required, the present invention uses only two type of nodes; nodes having sixteen elements (Full Nodes), and nodes having four elements (Compressed Nodes). Thus, any node originally having more than four non-nil pointers is left as a full node, while nodes having fewer than five non-nil pointers are converted into four element compressed nodes.

Elements in full nodes are indexed as if there were no pointer compression.

Each compressed node is associated with one of fifteen NODE-TYPEs. Each NODE-TYPE is made up of four bits and is further associated with a particular hardware (or software) configuration. When a particular node is selected (by a NODE-pointer in a previous node) so too is the corresponding NODE-TYPE.

The NODE-TYPE is used to either select and/or control particular hardware. The bits comprising the character to be searched at that node are used as inputs into the selected hardware. The hardware (which may be implemented in software) produces a four-bit signal, part of which is used as an index to the pointers in the compressed node.

The signal produced by the hardware (or software) represents the physical index that corresponds to the input search character. This physical index may be obtained from the input search character through the use of a mapping function which may be represented as a translation matrix.

Each pointer in a compressed node is associated with a POINTER-ID. The POINTER-ID is a two bit code that specifies which character value the pointer is associated with.

To perform a search at a compressed node, the four-bit NODE-TYPE is used to select or control a particular hardware. This arrangement, using the bits of the search character as inputs, produces a four-bit output signal.

Two of the output bits are used as an index into the pointers contained in the node. Once a pointer is selected the POINTER-ID which is associated with that pointer is compared to the other two bits of the output signal to determine if the character being searched matches the character represented by that pointer. If a match is found, the search continues. If no match is found, then the word being searched is not in the database, and the search terminates.

In an alternate embodiment, the logical to physical conversion is accomplished through software, not hardware. In a still further embodiment, the four-bit NODE-TYPE may be combined with the four-bit character code to address a look-up table.

The hardware required to implement the logical to physical translation of the present invention is sufficiently simple and efficient to provide a great advantage in speed over the prior art.

Further, the simple descriptors employed in the present invention (NODE-TYPE and POINTER-ID) provide memory savings over the prior art. For example, if look-up tables are used: prior-art devices require a look-up table with 220 (or 1,048,576) entries (16 bits for the bit mask and 4 bits for the character). The present invention requires a table having 28 or 256) entries (4 bits for the NODE-TYPE, 4 for the character).

Summarizing an embodiment of the invention from the operational perspective: The node to be addressed is first checked to see if it is a compressed node or a sixteen element node. If it is a full node, then the search character is used as a direct index into the node.

If the node to be searched is a compressed node then the search character is translated into a physical address by performing a mapping function which may be represented by a translation matrix. The bits comprising the translated address represent the row and the column values of the translation matrix in which the search character is found.

The row value from the output physical address is then used to address one of the pointers in the compressed node. Each such pointer includes a POINTER-ID which indicates which column of the translation matrix that pointer is associated with. Once the appropriate pointer is located (through the use of the output row bits) the POINTER-ID and the output column bits are compared to determine if the located pointer corresponds to the specific character being searched.

If the column bits match, the search continues using the address contained in the located pointer. A mismatch of the column bits indicates that a NIL pointer was in the search character's position in the associated sixteen element node, and that searching should terminate.

BRIEF DESCRIPTION OF THE DRAWINGS

FIG. 2 illustrates a database search employing a 16-bit bit-masks to perform pointer compression.

FIGS. 3A, 3B and 3C list the various NODE-TYPEs utilized in the present invention, along with the associated translation matrices.

FIG. 4 illustrates an improved method for pointer compression.

FIG. 6 provides two examples of pointer compression using NODE-TYPEs and POINTER-IDs.

FIGS. 9A, 9B and 9C list each NODE-TYPE, its associated translation matrix, and a hashing matrix for each NODE-TYPE.

FIG. 12 illustrates one possible software implementation of the hashing matrices.

FIG. 13A illustrates the building of an exemplary database.

FIGS. 13B1 and 13B2 illustrate the filled, uncompressed database.

FIGS. 13C1 and 13C2 illustrate the compressed database using NODE-TYPEs and POINTER-IDs.

FIG. 15A illustrates the memory arrangement of one possible embodiment of the present invention.

FIGS. 15B1, 15B2, 15B3 and 15B4 illustrate the bit breakup of a node-pointer utilized in the example embodiment.

FIGS. 15D, 15E, 15F1 and 15F2 illustrate the signal flow through the example embodiment.

DESCRIPTION OF A SPECIFIC EMBODIMENT

Figure 1:
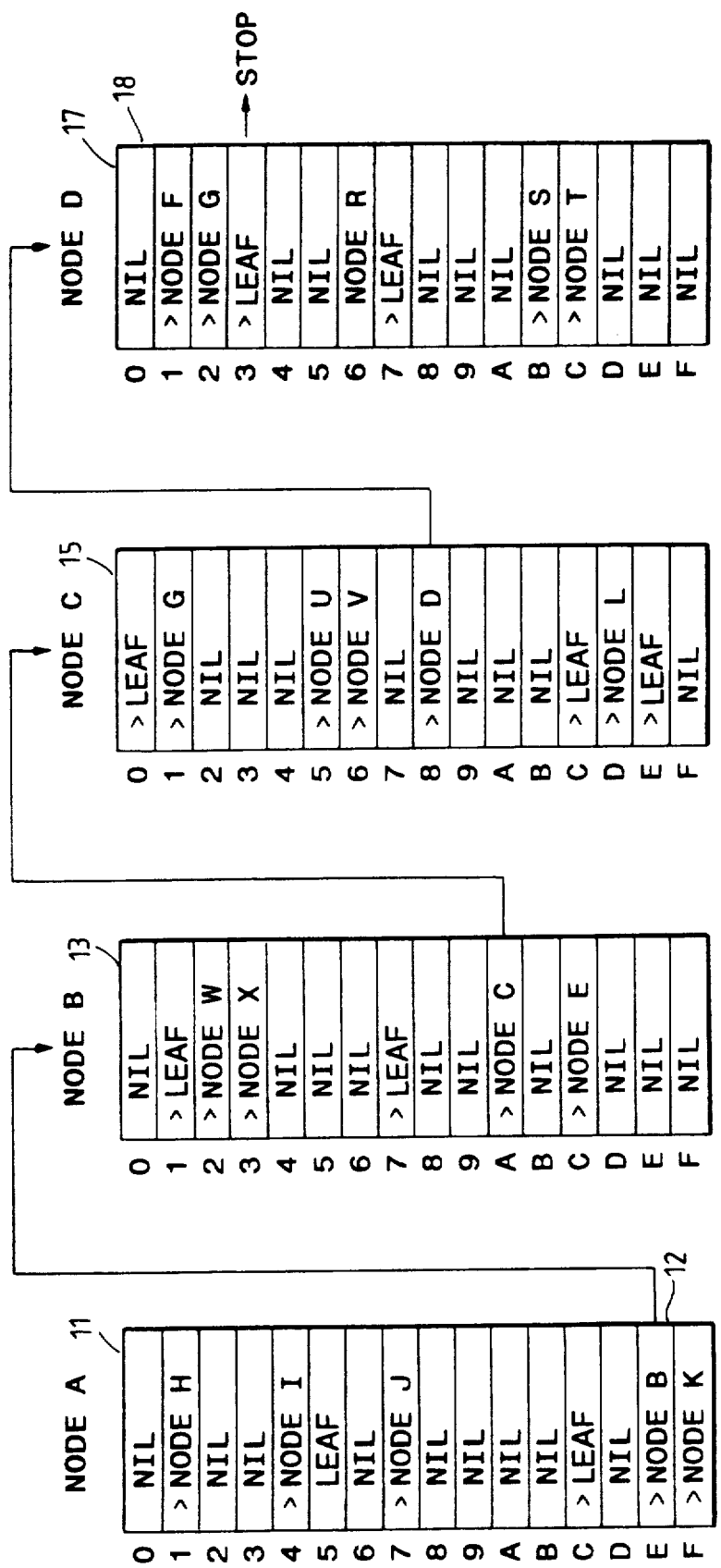
FIG. 1 illustrates a database search using a traditional TRIE-structured database.

As discussed above, in the present invention full nodes (nodes with 16 elements) are indexed as if there was no pointer compression. As such, all references to TRIE nodes will be toward compressed nodes (node with four elements) unless otherwise specified. In addition to pointer compression, "path compression" is also employed. Path Compression eliminates all nodes having only one non-nil element. A method and apparatus for performing path compression is described in the patent application entitled COMPRESSED PREFIX MATCHING DATABASE SEARCHING, filed on Jul. 12, 1989, Ser. No. 378,718, now abandon which is hereby incorporated by reference.

I. THE NODE-TYPE AND ASSOCIATED HARDWARE

Since each compressed node has four elements, with each element corresponding to one of sixteen possible characters there are 1820 possible combinations of four characters (i.e, 16-chose-4, 16!/[12! *4!]) that may correspond to any given compressed node. The present invention utilizes fifteen four-bit NODE-TYPEs and four two-bit POINTER-IDs to describe all possible element combinations, and thus all possible compressed nodes.

As discussed above, in the present invention each compressed node is associated with a four-bit NODE-TYPE. Each NODE-TYPE is associated with particular hardware (or software) which is capable of performing a particular logical to physical index translation. These NODE-TYPEs represent the possible combinations of logical indices that may be translated by the hardware associated with each NODE-TYPE. Since there are fifteen possible NODE-TYPEs, four bits are required to indicate the appropriate NODE-TYPE selected.

The hardware associated with each NODE-TYPE operates in response to the character being searched at that node. As previously discussed, the search character is a portion of the string word being searched, and is usually four-bits in length. Being four bits in length, each search character may be referred to by its hexi-decimal equivalent. For example search character 1111 is equivalent to Fh, while 1001 is equivalent to 9h. Unless otherwise specified, the search characters will be referred to in hexi-decimal form.

Each NODE-TYPE and a corresponding translation matrix is illustrated in FIGS. 3A–3C. The translation matrices represent possible combinations of characters (logical indices) that may be translated by each of the fifteen hardware arrangements.

The 15 translation matrices shown are only one possible set of 15. There are many other sets of 15 translation matrices that are functionally equivalent to those illustrated. Such equivalent matrices may be easily derived from those illustrated.

The hardware (or software) implementation is capable of translating character combinations from a logical index to a physical index. The translations performed by each hardware (or software) arrangements are represented by the associated matrices.

When a full node is compressed to a compressed Node (or a compressed node is constructed) it is generally known which four characters are associated with that compressed node. For example, for the compressed node discussed earlier (FIG. 2 (22)) it is known that the compressed node corresponds to the characters 1h, 3h, 7h, and Bh. Given any compressed node, and its corresponding characters, the translation matrices may be used to select an appropriate NODE-TYPE.

These translation matrices may be interpreted as follows: The hardware or software associated with each NODE-TYPE can be used to translate from logical indices to physical indices the character codes for any node having one element corresponding to a character from row 0, another corresponding to an element from row 1, and two others corresponding to a character from each of rows 2 and 3. The characters comprising each combination may be selected from any column as long as there is only one element selected from each row.

For example, the hardware associated with NODE-TYPE 0001 is capable of performing translations for a compressed node corresponding to the characters 3h, 6h, 8h, Eh. This is because each character is located in a distinct row of the translation matrix. The same hardware could perform translations for a node having elements corresponding to the characters 0h, 5h, Fh, and Dh or the characters 3h, 1h, 8h, Ah since each of these characters is in a distinct row of the translation matrix.

However, using the same hardware (NODE-TYPE 0001), it would not be possible to translate a combination of 6h, Bh, Ch, and Dh, as the characters Bh and Ch are located in the same row (row 2) of the translation matrix. For such a combination another hardware combination, such as the one represented by NODE-TYPE 1001, is required. NODE-TYPE 1001 has 6h in row 2, Bh in row 3, Ch in row 0 and Dh in row 2.

As this example illustrates, it is not necessary that the characters be found in the same order in the translation matrices as they are in the full node. The only requirement for selecting a NODE-TYPE given any given combination of four characters is that each character be found in a distinct row of the translation matrix.

In this manner, it is possible to select the appropriate NODE-TYPE and its associated translation hardware or software once the four characters corresponding to a given node are known. For example, if the compressed node in FIG. 2 (22) is to be translated with the present invention, a NODE-TYPE of 1111 would be selected. This NODE-TYPE is selected since each of the four characters corresponding to the node are found in distinct rows of the translation matrix associated with NODE-TYPE 1111.

Once the proper NODE-TYPE is selected, it is known that the hardware or software associated with the NODE-TYPE 1111 is capable of performing appropriate logical to physical translations for a node having characters corresponding to 1h, 3h, 7h, and Bh.

The NODE-TYPE for a particular node may be stored in a particular memory space associated with that node. In one embodiment, the NODE-TYPE for each node is stored along with the pointers that point to the node. In this embodiment, each node pointer not only contains a pointer address indicating the location of the next node, but a NODE-TYPE indicating the translation matrix to be implemented at the next node.

Since there are only fifteen NODE-TYPEs one four bit combination (0000) is not used. Thus, a NODE-TYPE of 0000 may be used to indicate that the next node is a full (sixteen element) node.

II. POINTER-IDs

In addition to NODE-TYPEs, the present invention utilizes a two bit code known as a POINTER-ID to implement the logical to physical index translation for compressed nodes. Each POINTER-ID is a two-bit code which represents the character associated with each pointer in a compressed node. While each node is associated with one of fifteen NODE-TYPEs, each element within a node is associated with one of four POINTER-IDs. The POINTER-IDs may be selected only after the NODE-TYPE for a given node is known.

The POINTER-IDs indicate which character a particular element in a node corresponds to. As discussed above, each translation matrix is a 4×4 representation of the specific translation effected by the hardware or software associated with each NODE-TYPE. The NODE-TYPEs only indicate that a particular node may represent any one of 256 possible combinations (e.g., 1-of-4 elements from row 0, 1-of-4 from row 1, etc. . . ). The POINTER-IDs are used to indicate which particular characters correspond to a given compressed node. The POINTER-IDs may be interpreted as a binary representation of the particular column in the translation matrix that the particular element in the compressed node corresponds to.

For example, if it is known that a given node corresponds to the characters 3h, 2h, Ch, and Dh, NODE-TYPE 0001 may be selected (since each character is in a distinct row). The NODE-TYPE 0001, however, does not uniquely describe the given node. For example NODE-TYPE 0001 could also represent a node corresponding to 7h, 5h, Fh, and Dh.

To fully describe the node, POINTER-IDs are required. As discussed above, a POINTER-ID is associated with each element in a compressed node. In the above example (node corresponding to 3h, 2h, Ch, and Dh), the POINTER-ID for the first element would be 01, since the character 3 is in column 1 of the translation matrix. Since the second element corresponds to the character 2h, it will be associated with POINTER-ID 00 as 2h in column 0 of the translation matrix. In a like manner, the POINTER-IDs for the third and fourth element may be determined. The third element's POINTER-ID would be 10 (as Ch is in the 2nd column (10 binary = 2)), and the fourth element's POINTER-ID would be 11 (for column 3).

FIG. 4 provides an illustrative example of node compression using both a NODE-TYPE and POINTER-IDs. In the example, a full node, node C (60) is first compressed into a compressed node, node C', having four elements (62). As the full node had non-NIL pointers corresponding to 3h, 6h, 8h, and Eh, a translation matrix must be selected wherein each of the above characters is in a separate row. Since the translation matrix corresponding to NODE-TYPE 0001 meets the row requirements, it will be selected.

During a search the NODE-TYPE for NODE-C' would have been assigned at the same time the pointer to node C' was referenced.

The pointers from the full node may then be moved into position in the compressed node. The order should follow that given in the translation matrix for NODE-0001 (i.e., the pointer corresponding to character 3h first, 6h second . . . etc.)

In addition to the pointer value, a POINTER-ID is stored with each element in the compressed node. The POINTER-ID corresponds to the column where the character corresponding to that pointer resides in the selected translation matrix. In this example the POINTER-ID for the first element will be 01 since the character 3h is in the 1st column of the translation matrix corresponding to NODE-TYPE 0001.

In a like manner, the POINTER-ID for the second element will be 10, since character 6h is in the second column. The POINTER-IDs for the third and fourth elements will be 00, and 10 respectfully.

By following the above procedure a compressed TRIE-structure may be built. For each compressed node a suitable NODE-TYPE is selected. Given the selected NODE-TYPE and its associated translation matrix, suitable POINTER-IDs may be selected and entered into the node.

II. BUILDING A COMPRESSED TRIE DATABASE.

Starting from scratch, there are at least two methods for building a compressed TRIE database. The first method is known as the inductive method, and the second as the parallel method.

A. INDUCTIVE BUILD

In an inductive build, the entries to be inserted into the TRIE-structure are inserted one after another. When the first entry is entered, a root node is created. From there subsequent nodes are created to correspond to each character of the string to be inserted. Each pointer of the newly created node (other that the character for which it was created) is set to a NIL-pointer. Subsequent entries are first matched against the existing TRIE. When a new entry is not a duplicate, a new branch is constructed to hold the new entry.

Figure 5:
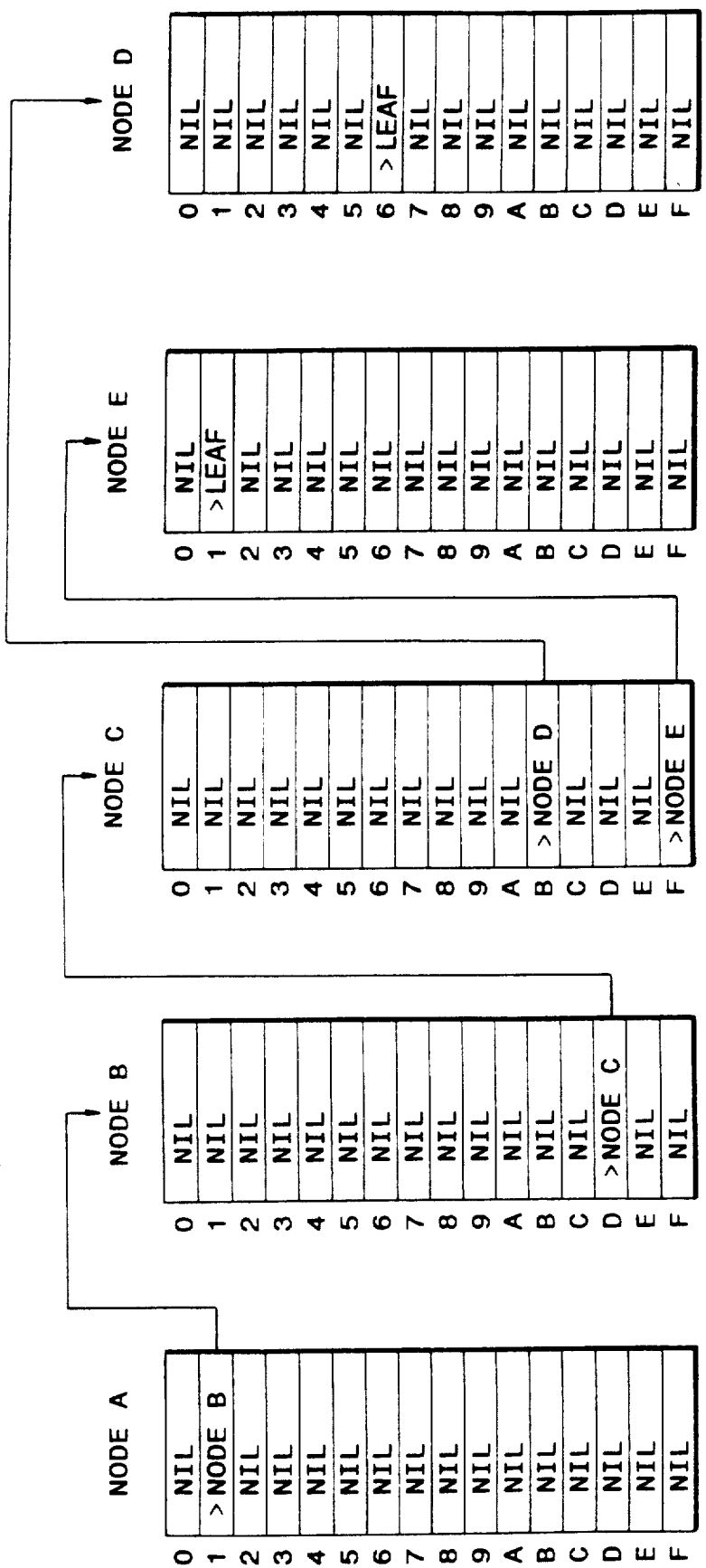
FIG. 5 illustrates an inductive method of building a TRIE-structured database.

FIG. 5 gives an example of such an inductive build. First the string 0001 1101 1011 0110 is entered into TRIE. As it is the first entry, four nodes are created. The second entry 0001 1101 1111 0001 matches the first TRIE branch through the first two nodes. Since there is no element that corresponds to 1111, Fh, a new branch needs to be created. As such a branch is required to be made at the third node, one additional node is added. A branch is made by changing a NIL-pointer into a non-NIL pointer to either point to another node, or indicate that a matching entry has been found (i.e., a LEAF node).

Since it cannot be determined at the time of building a new node how many pointers will be placed in the node, it is advisable to create all new nodes as full nodes (i.e., 16 pointers). Once the TRIE is built the full nodes with four or less non-nil pointers can be converted into a compressed node.

B. PARALLEL BUILD

In order to perform a parallel build all entries to be placed in the database must be available for simultaneous inspection.

Building starts by taking a copy of the first character of each entry and throwing it into a "bucket." All duplicate characters are thrown out, and what is left are the characters that need to have corresponding pointers in the first node. Since no new entries will need to be placed in the node, a compressed node can be created if needed.

Once the first node is constructed, the exit pointer corresponding to the first root-node character is selected. The second character of each entry whose first character matches the character corresponding to this first root-node character is then thrown into a new bucket. The process of throwing out duplicates and constricting a new node is repeated.

This type of building may continue in one of two fashions. In a breadth-first fashion, each node is filled prior to the construction of any following nodes. In a depth-first construction each select subset of database entries is filled before moving to the next pointer at a previous node.

C. SELECTING THE NODE-TYPE

Once the TRIE-structure is constructed, the nodes having less that five non-nil pointers may be compressed into compressed nodes. When a compressed node is constructed (by either parallel or inductive construction) a NODE-TYPE is first associated with each compressed node.

One possible method for selecting an appropriate NODE-TYPE is to systematically compare the characters corresponding to the four node elements with the various matrices in FIGS. 3A-3C. If a matrix is found where the four characters reside in distinct rows then a match has been made. The NODE-TYPE corresponding to the translation matrix is then associated with the compressed node, and the elements are then placed in the compressed node in the order dictated by the matching matrix.

If fewer than four characters correspond to a node, some dummy character (e.g., 0) may be used when selecting a NODE-TYPE. When the node holding these characters is built, the node corresponding to the dummy character is given a NIL-pointer.

In the interests of speed, an alternate method may be used to select the appropriate NODE-TYPE for any given compressed node. In this method a look-up table is employed. To use the look-up table, the four given characters associated with non-nil elements are combined into a 16-bit code. This code is used to address a 64K entry look-up table which will return an appropriate NODE-TYPE. The look-up table may also return some indication of the order in which the four characters are to be assigned at the node.

Construction of the look-up table may be accomplished by taking each of the 64K entries and determining which four characters address that entry. The translation matrices may then be linearly searched until an appropriate matrix is found. The NODE-TYPE corresponding to this matrix may then be stored in the look-up table.

Once the NODE-TYPE for a given node is selected, the pointers from the full node may be copied into the corresponding elements of the compressed node. As the pointers are moved to the compressed node, a POINTER-ID for the associated character is assigned to each pointer, and stored with the pointer in the compressed node. In some embodiments, the NODE-TYPEs for the nodes being pointed to may also be stored with the pointers and the POINTER-ID.

FIG. 6 provides two examples of a compression from a full node to a compressed node where the POINTER-IDs and NODE-TYPEs are stored with the pointer elements.

D. DATABASE MAINTENANCE

It may be necessary to modify the database by occasionally adding new entries or deleting old ones. This may be done by adjusting the TRIE-structure rather than by rebuilding it.

Adding a new entry amounts to the same thing as building a TRIE-structure inductively. Hence, an existing node may grow from a compressed node, to a full node, or from a compressed node with fewer than four non-NIL pointers to a compressed node without NIL pointers.

If a compressed node grows from one with NIL pointers to one without (or with less), a new NODE-TYPE may need to be chosen. This may occur if the NODE-TYPE selected using the dummy character cannot translate the combination which includes the newly added character. In such a situation, a new NODE-TYPE, along with new POINTER-IDs must be chosen.

In some situations this re-selection process may involve completely reconstructing the node. As such, it is generally desirable to include a table of back pointers so that parent nodes can be located and appropriately altered.

The deletion of a database entry is accomplished simply by locating the entry to be deleted and setting the LEAF pointer to a NIL pointer. If, as a result of turning a LEAF pointer into a NIL pointer, the node once containing the LEAF pointer is reduced to a node having all NIL pointers, then the node may be eliminated and its parent pointer (which points to this node) set to NIL. It is also possible that the number of non-nil pointers in this node or its parent node will decrease to below five, in which case the appropriate node may be compressed.

It is apparent that database maintenance causes old nodes to be returned to a list of available free memory, and causes new nodes to be taken from a list of available node memory.

Since there are two different size nodes, keeping track of the available and used node memory becomes difficult. One possible Way to maintain the available node memory is to keep two separate memory stacks; one for full nodes, one for compressed nodes.

An alternate method of maintaining the node memory is to use a single list of free memory. Such an arrangement is illustrated in FIG. 7A. This list (70) has two ends (72, 74) and separate pointers, P16 (76) and P4 (78), to point to each end.

When the TRIE-structure is empty, the free list is full, and Pointer P16 (76) points to 'N' free full nodes. At the same time, pointer P4 (78) points to 4*N free compressed nodes.

As the TRIE-structure is built, compressed nodes are taken from one end of the list and full nodes are taken from the other end. This method of utilizing one node-queue and two pointers provides memory savings over the use of two separate memory stacks.

To ensure that memory is used in a compact, and contiguous fashion, old nodes that are eliminated are not returned to the list. These nodes are swapped with the used nodes at the appropriate end of the list; and the pointer is then moved one position. This is required to prevent pointer collision and under-utilization of the node memory stack. In this manner the memory used by the old node is placed in the free list so as to promote compact use of available memory.

Figure 7B:
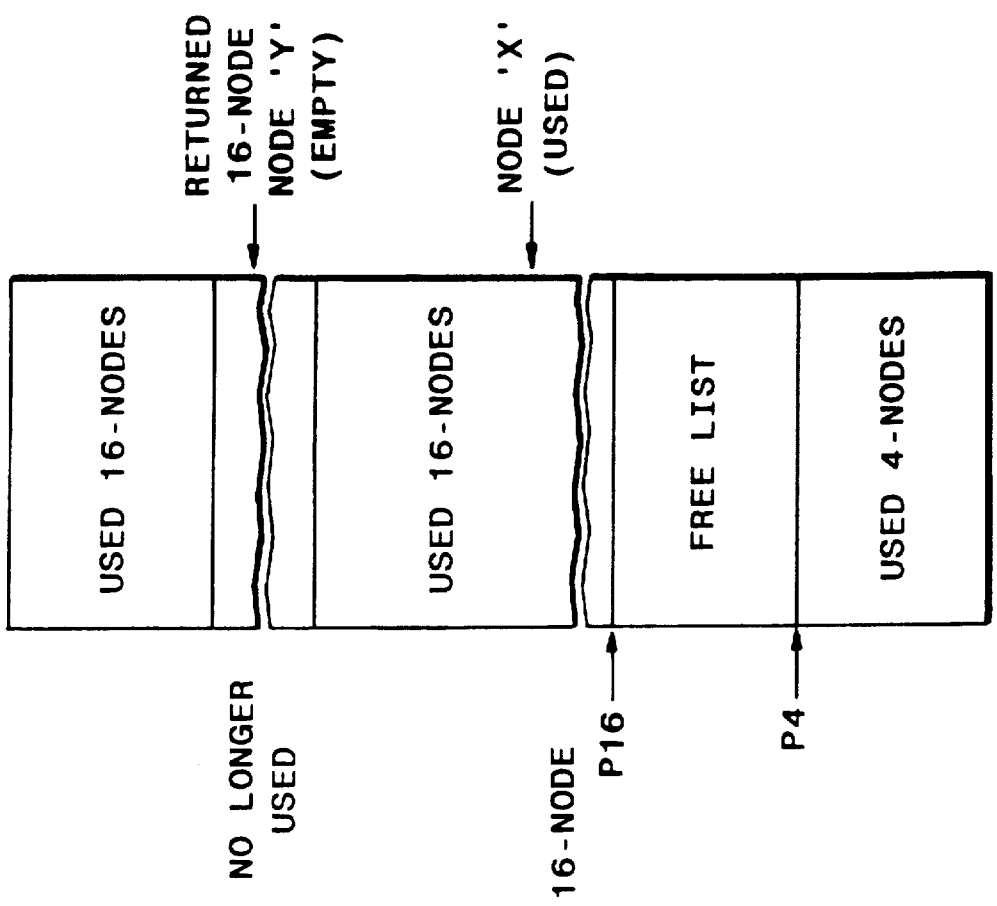
FIGS. 7B, and 7C illustrate node swapping using a single list of free memory.
Figure 7A:
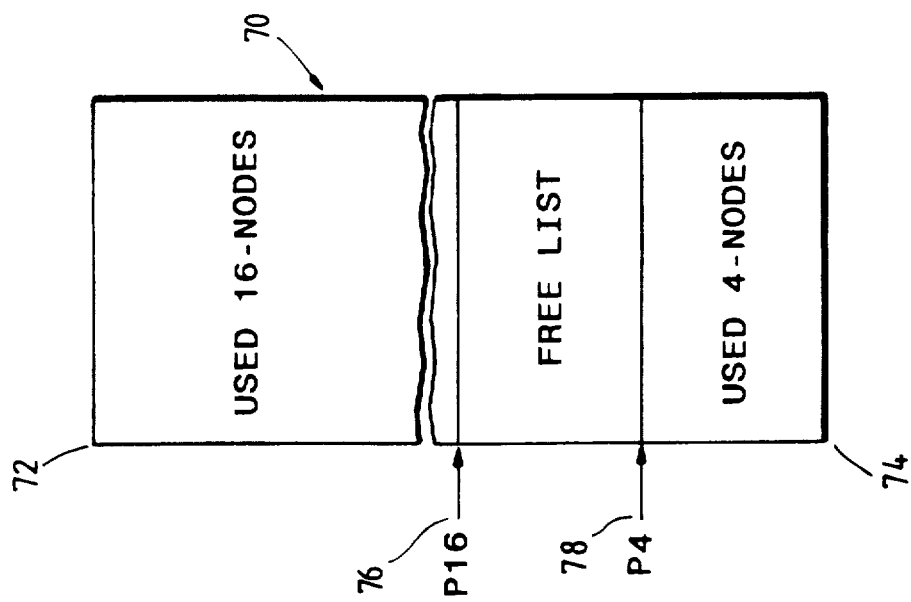
FIG. 7A illustrates one method of maintaining the node memory.
Figure 7C:
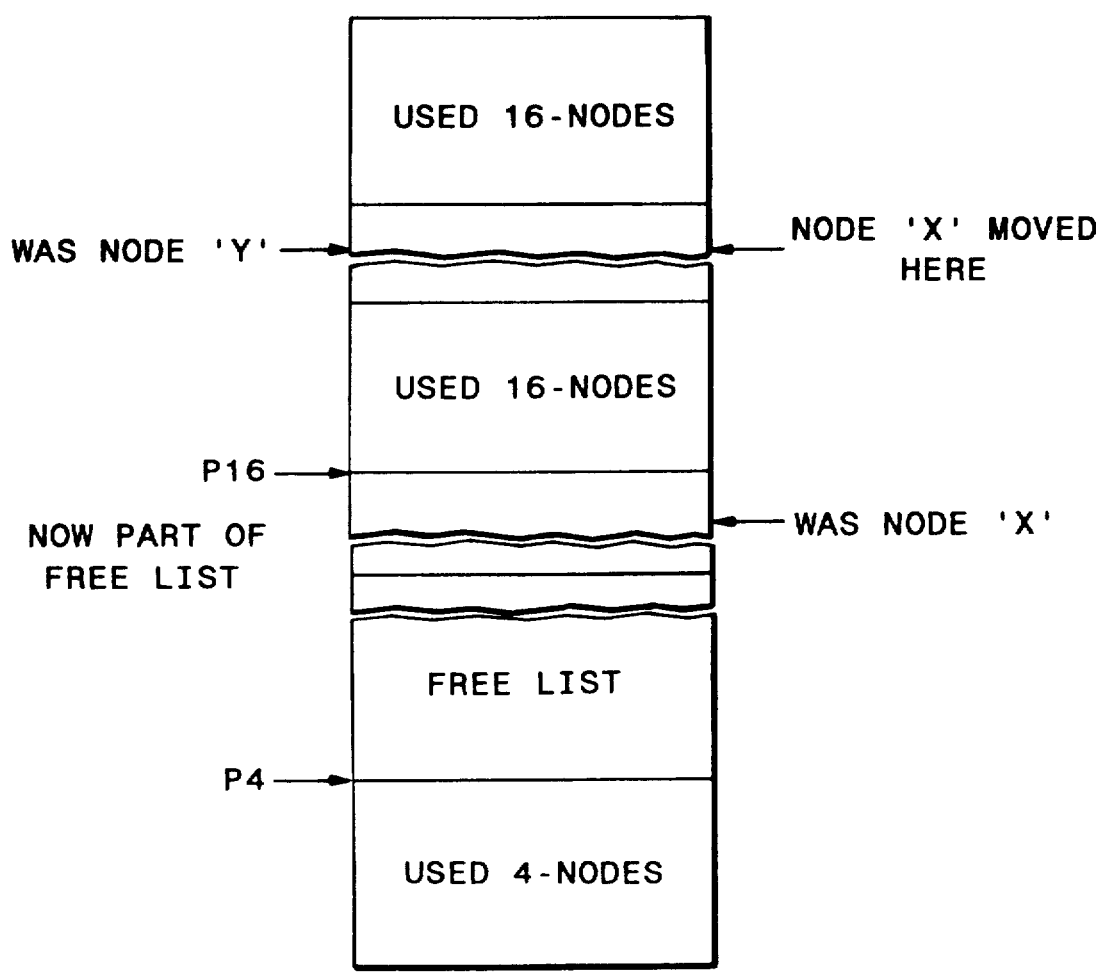

An example of such node swapping is illustrated in FIGS. 7B and 7C. In FIG. 7C the P16 pointer points to Node X which is the last used node. In the example Node Y is eliminated. If node swapping was not employed, node Y would be returned to its corresponding memory location possibly resulting in fragmented memory. Such a result is pictured in FIB.7B.

FIG. 7C illustrates the advantages that can be obtained through node swapping. In this example, node Y is not returned to the memory stack but is swapped with node X, which was the last node pointed to by P16. As FIG. 7C illustrates how swapping allows both the used and the free memory to remain contiguous, and thus promotes efficient use of the available memory.

III. SEARCHING IN A COMPRESSED TRIE DATABASE.

Once the compressed TRIE-structured database is constructed, the search may be done in the following manner.

The search first begins by locating a register which holds a pointer to the first node to be examined (the root node). This 'pointer' is identical to the format of an element in a node. As such, the pointer to the root node may indicate that the root node is a compressed node and, if so, the NODE-TYPE. The pointer to the root node does not necessarily have to be a register, it is only necessary that some particular location contain a pointer to the root node.

First, if the node to be searched is a full node, the search is carried out as if there were no pointer compression (i.e., the character to be searched is used as direct index into the node).

If the node to be searched is a compressed node, then the character value (the logical value) needs to be translated into a physical address to locate the correct pointer.

As discussed above, this translation is accomplished through specific hardware or software associated with each of the fifteen NODE-TYPEs. The hardware is utilized to effect the translation scheme illustrated in the corresponding translation matrix. Once a particular compressed node is selected, so too is the corresponding NODE-TYPE.

Figure 8:
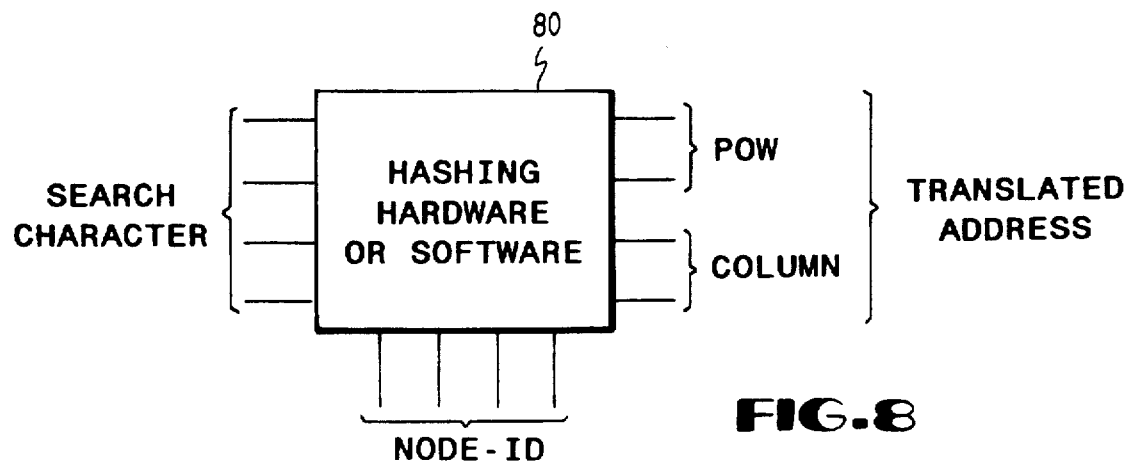
FIG. 8 is a block diagram of one embodiment of the present invention.

FIG. 8 illustrates one possible embodiment of the invention. In this embodiment block 80 represents hardware capable of performing the various translation functions corresponding to the NODE-TYPEs. The four-bit representation of the character being searched is used as an input into the hardware block (80). Also used as an input is the four-bit NODE-TYPE.

In response to these two signals, the translation hardware (80) produces a four-bit output which corresponds to the physical address associated with the logical address referenced by the character to be searched. The first two bits of this physical address are used to select one of the four pointers in the compressed node.

The second two bits are then compared with the POINTER-ID associated with that pointer. If the POINTER-ID matches the second two bits of the physical address, a match is found and the search continues at the node referenced by the pointer address. If the POINTER-ID does not match the physical address bits, there is no match and the search terminates (i.e., a NIL pointer has been reached).

The translation performed by the translation hardware or software is as follows. Once the NODE-TYPE is selected so too is particular hardware or software and a particular translation matrix. The hardware is designed to perform the function illustrated by the associated translation matrix. For example, using a NODE-TYPE input of 0001 and a character input of 0100, or 4h, the translation hardware or software would produce an output signal of 0010. The first two bits of the output represent the corresponding row of the translation matrix (i.e., in this example, the first row (row 0)) The second two bits of the output represent the column of the corresponding translation matrix. In this example the column value is 10 (binary 2) since the input character (4h) is in the second column.

In addition to corresponding to the translation matrix, the output from the translation hardware is also used to address and verify the physical pointers in the compressed node. In the example given above, since the row value is 00 the pointer in the first element (row 0) will be selected. The POINTER-ID associated with the specific pointer will then be compared with 10, the last two bits of the output signal. A match indicates that the first pointer corresponds to the character 4h, and the search will continue. If the bits and the POINTER-ID do not match, the search will terminate as there is no pointer associated with the character 4h at the selected node.

In this manner nodes constructed in the fashion described above may be searched using only a four-bit NODE-TYPE, and a two-bit POINTER-ID. The use of these two codes requires only 6 (4+2) overhead bits for each pointer element. This results in significant memory savings compared to devices using a sixteen bit bit-mask for index translation.

IV. IMPLEMENTATION OF THE TRANSLATION HARDWARE

A. Hardware

As an aid for constructing a hardware implementation of the translation functions, FIG. 9 illustrates each NODE-TYPE, its associated translation matrix, and a third matrix. This third matrix is known as a "Hashing" matrix.

The construction of hardware for each NODE-TYPE is as follows: First, the associated NODE-TYPE is located in FIG. 9A or 9B or 9C. Next, the corresponding hashing matrix is obtained. Each hashing matrix represents a linear function which is implemented through either hardware or software that maps a logical index (i.e., the search character) to a physical index which is used to address the corresponding element in the compressed node having a NODE-TYPE associated with that hashing matrix.

As discussed above, each hash matrix is a representation of a particular linear map function. For the purpose of this discussion a linear function may be described as essentially follows: If A is set of characters (including a1 and a2) and # is some non-trivial binary operator chosen such that the result of (a1 # a2) is also a character in A. A function may be defined, H(), which maps characters from set A onto elements of a different set B. If set B also includes a non-trivial binary operator, @, such that (b1 @ b2) is an element of B, then the function H() is linear IF AND ONLY IF operators # and @ can be found such that:

H(a1) @ H(a2)=H(a1 # a2) for all possible elements a1 and a2.

For the linear functions represented by the hashing matrices, set A corresponds to the set of all possible search characters (logical indices), and set B corresponds to the physical indices used to address the proper node element. Thus each hashing matrix corresponds to a map function H(), mapping from the logical indices to the physical indices.

Since the map functions represented by the translation matrices and their associated hashing matrices are linear, a simple hardware arrangement may be derived for each function (or NODE-TYPE since each NODE-TYPE is associated with one of the fifteen possible map functions).

Although there are several possible hardware implementations for the binary operators #, and @, only the hardware utilizing the exclusive-or (X-OR) operator will be discussed.

Figure 10A:
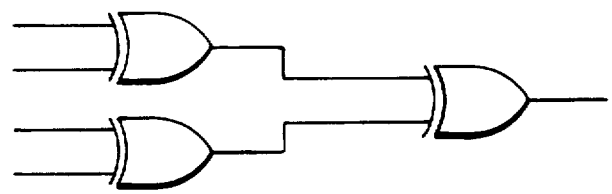
FIGS. 10A, and 10B illustrate the exclusive-or operation and symbol.
Figure 10B:

The exclusive-or hardware produces a logical 1 signal whenever either of its two inputs is 1. If both inputs are 1, or both inputs are 0, the output will be zero. FIG. 10A illustrates the conventional symbol for the exclusive-or hardware. The X-ORing of more than two inputs may be illustrated by breaking up the input signal into groups of two. An example of X-ORing four inputs is given in FIG. 10B.

Figure 11:
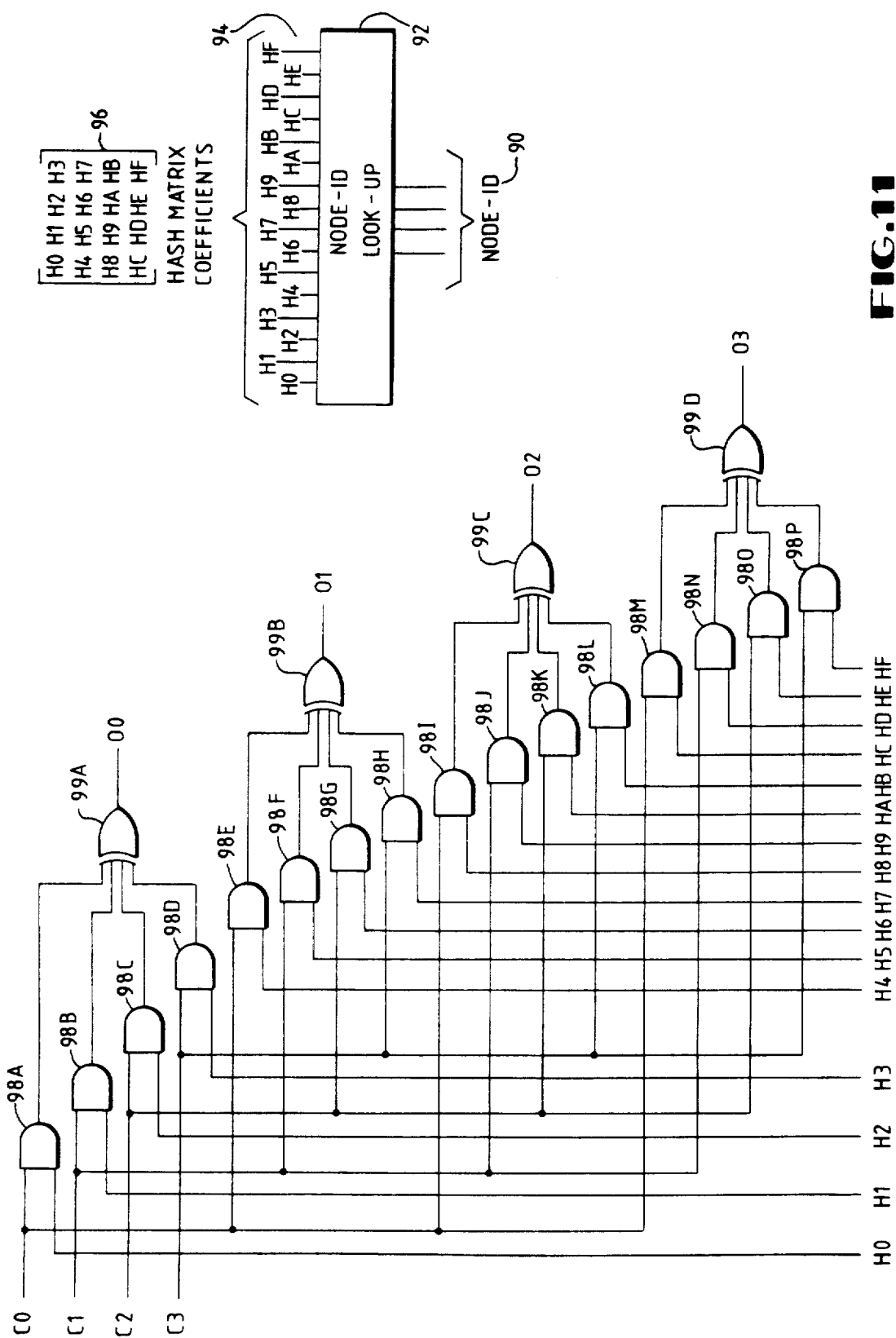
FIG. 11 illustrates one possible hardware implementation of the hashing matrices.

FIG. 11 illustrates one possible hardware implementation of the hashing function. Once the NODE-TYPE (90) is obtained (e.g., from the pointer in the parent node) it is input into a look-up table (92) having 16 (2**4) entries. Each entry in the look-up table comprises sixteen bits representing the sixteen matrix coefficients of a hashing matrix. Thus, the look-up table produces a sixteen bit output (H0-HF) which represents the coefficients of the hashing matrix associated with the input NODE-TYPE. The correlation between the look-up table output and the coefficients of the hash matrix is illustrated in matrix (96).

Once the matrix coefficients are out put from the look-up o table (92) they are input into the hashing hardware illustrated in FIG. 11. Each matrix coefficient serves as one input into one of sixteen AND gates (98A-98P).

The character bits for the search character (C0-C3, with C0 being the most significant bit) are also input into the hashing hardware. Each character input bit is input into four of the sixteen and gates.

The output from the sixteen and gates is grouped into groups of four and input into four, four-input X-OR gates (99A). The operation of these gates is equivalent to that illustrated in FIG. 10B. The output of the four X-OR gates (O0-O3, with O0 being the most significant bit) represents the hashed (or physical) index corresponding to the input search character.

The illustrated hardware may be envisioned as a direct implementation of the hashing matrix. Each grouping of four AND gates (each X-OR) gate may be thought of as a separate row of the hashing matrix. Thus the output of each X-OR gate is equivalent to the binary matrix multiplication of the row represented by the associated hashing bits times the column, represented by the search character bits in columned form.

For example, given the search character 7h (0111), and NODE-TYPE 0010, the hardware will operate as follows.

First, the NODE-TYPE 0010 will be input into the look-up table (92). The look-up table will yield the associated matrix coefficients (e.g., 1010000101000010). These matrix coefficients will be ANDed with the input character bits to produce the input for the X-OR gates. For this example the input to X-OR (99A) would be 0010, the input to X-OR (99B) 0001, the input to X-OR (99C) 0100, and the input to X-OR (99D) would be 0010.

Thus the output from the hardware would be 1111, or row 3, column 3. Referring back to FIG. 9A it may be noticed that the character corresponding to row 3, column 3 for the translation matrix associated with NODE-TYPE 0010 is 7h (which was the input character).

Thus, given the hashing matrices for each NODE-TYPE, the hardware implementation is quite simple.

B. Software Implementation

Alternate embodiments are envisioned wherein the translation from logical to physical addresses takes place through the use of software, not hardware. There are at least two ways in which this may be carried out.

1. Matrix Multiplication

The logical to physical translation may be accomplished by multiplying the hashing matrix associated with the NODE-TYPE with the four bits of the input search character in column form. Such a multiplication may be accomplished through known programming techniques to yield the translated (physical) address.

For example, given a search character 7h (0111), and NODE-TYPE 0010, the translated address may be determined as follows. Software may be developed (using traditional programming methods) to perform the matrix multiplication illustrated in FIG. 12. Such a multiplication will yield a four bit output which is identical to that which would be obtained using the hardware described above.

In a like manner, a program for performing matrix multiplication may be developed for each of the fifteen NODE-TYPEs.

2. Look-up Table

In the alternative to using a multiplication program, a high-speed look-up table may be employed. To obtain the translated address, the four bit search character may be combined with the 4-bit NODE-TYPE to yield an 8-bit address. Such an address may be used to address a translation table having 256 (2**8) entries. Such a translation table may be accomplished by systematically combining the NODE-TYPE with the character codes, determining which address this would access, and storing at that address the translated address that corresponds to that particular NODE-TYPE and character combination.

V. EXAMPLE

FIGS. 13A, 13B1, 13B2, 13C1 and 13C2 illustrate the building of a TRIE-structured data base having eleven entries. In FIGS. 13B1 and 13B2 the entries are placed into a TRIE-structure using uncompressed nodes. FIGS. 13C1 and 13C2 illustrate the TRIE-structure as compressed using the method described above. In this example, a NODE-TYPE for the following node and a POINTER-ID for the present node are stored in each element of each node. Also in this example, LEAF nodes are provided for any entry equal to 0, 1, or 2. For full nodes, the POINTER-ID bits are irrelevant.

Figure 14A:
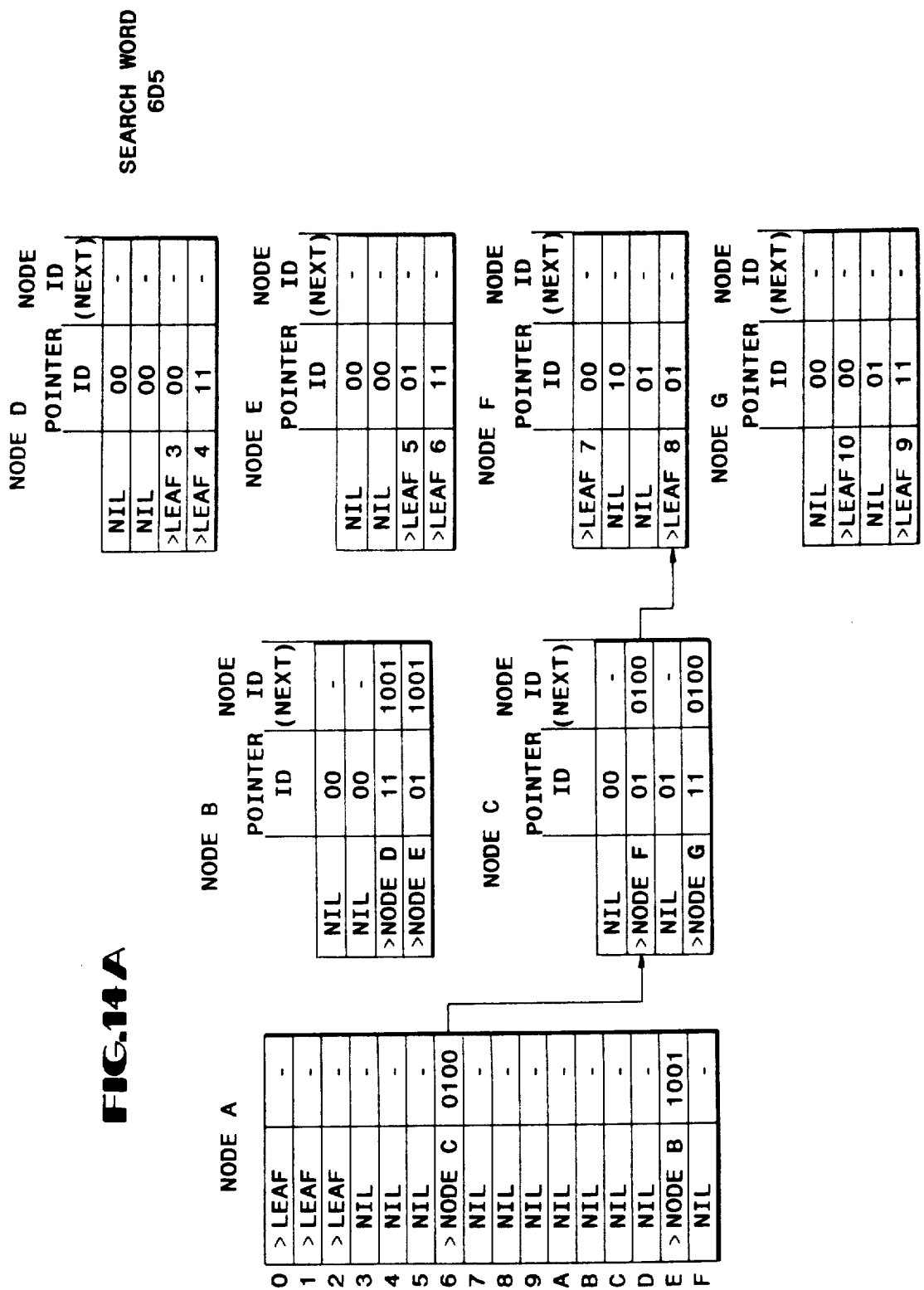
FIGS. 14A and 14B illustrate exemplary searches done on the example database.

FIG. 14A illustrates a search that may be done on the exemplary database for the search word 6D5. As a match is found for this search word, the search terminates in a LEAF node.

Figure 14B:
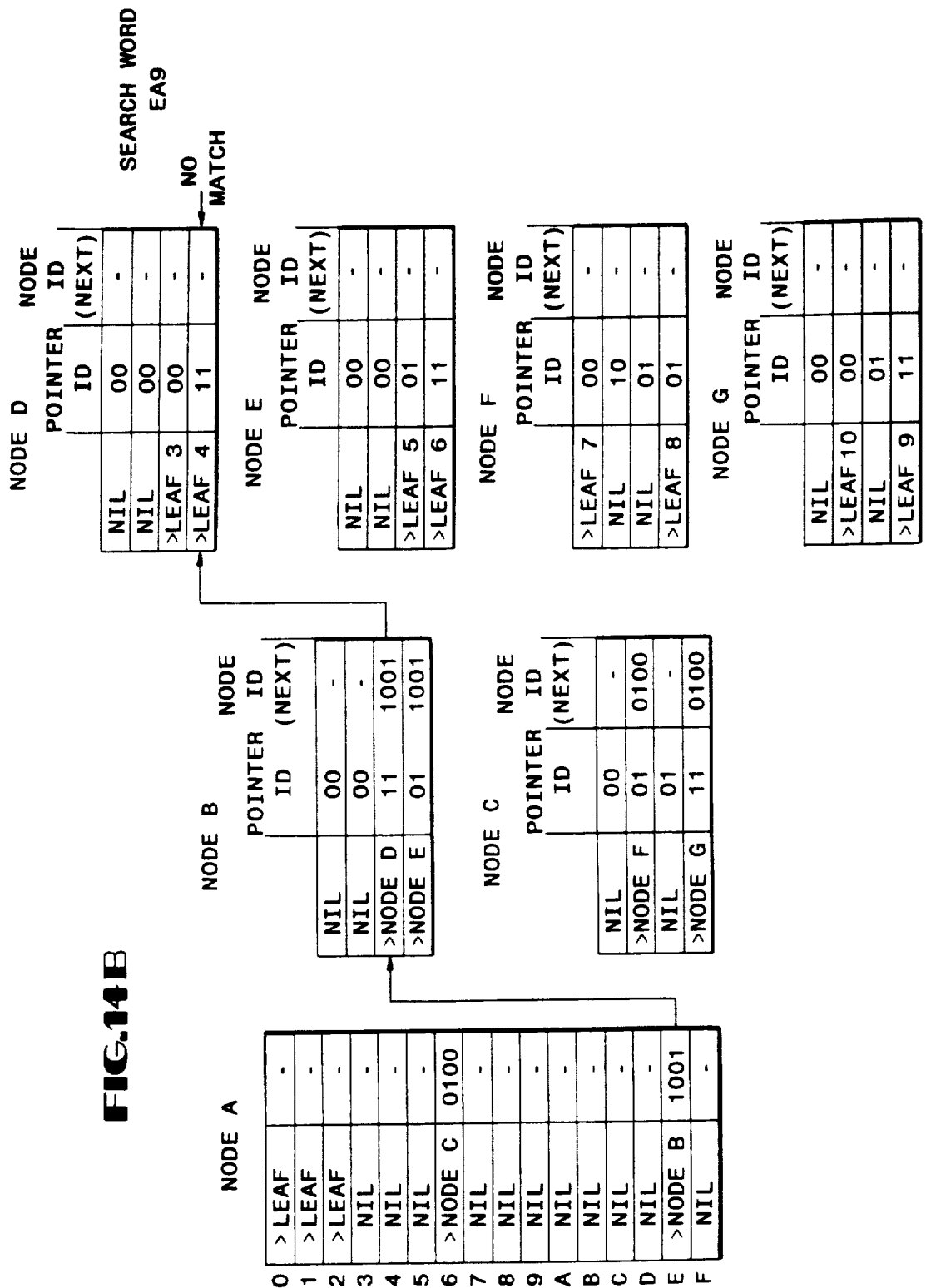

In FIG. 14B the same database is searched using a different search term, EA9. Here, a corresponding entry can't be found, and the search terminates at node D where the POINTER-ID is found not to match the generated translated address.

VI. SPECIFIC IMPLEMENTATION

In the discussion below, it is assumed that path compression as per the above referenced application is employed.

FIGS. 15A-5F illustrate one specific embodiment of the present invention. The embodiment illustrated is capable of holding at least 30K of entries. There are 32K terminal nodes and 30K transition nodes. 2K of the transition nodes may be mapped to provide additional memory to support proper parsing for a specific implementation (e.g., for ISO 8348/AD2 format network addressing). Attempts to address the mapped nodes are interpreted as NIL-nodes. In this embodiment path compression, as well as pointer compression is implemented.

FIG. 15A illustrates the memory arrangement utilized in the present invention. Seven 1Meg. SRAMS's are arranged as follows: six 256K*4 chips are arranged as a 256K*24 memory bank; and a seventh SRAM is employed as a 128K*8 memory bank. The 256K*24 memory bank is know as the String/Pointer memory. The 128K*8 memory bank is known as the Control/Extension Word memory.

The String/Pointer memory is divided into two banks of 128K*24. The upper bank is called the "pointer bank" and is considered to be a contiguous region of 32K of compressed nodes. This region is addressable by an address of 15 node-address bits. A sixteenth address bit is used to indicate whether the node is a transition node (a node pointing to another node), or a terminal node (a node indicating the end of a search). This sixteenth bit makes for a total of 64K of addressable compressed node.

The lower bank in the String/Pointer bank is known as the "string bank." This bank is divided into 64K of dual words, each dual word associated with one of the 64K addressable nodes. Each dual word consists of a first string word, and a second string word. The use of string words is discussed in the co-pending application entitled COMPRESSED PREFIX MATCHING DATABASE SEARCHING and will not be discussed herein.

The 128K*8 memory bank is known as the control/extension word memory. This memory bank is divided into 64K of dual words, each dual words associated with one of the addressable compressed nodes. The control/extension words are used in path compression and are discussed in the above-referenced patent application.

FIG. 15B1 illustrates the division of the 24-bit pointers which are stored in the string/pointer memory. Each four node parity bit, and a String bit. The parity bit is used to ensure that the pointer is stored correctly, while the String bit indicates that a path compression string is stored at the next node. For the purposes of this illustration, it is assumed that the String bit is *not* set, i.e., a path compression string is not stored at the next node. A discussion of proper operation when the String bit is set is contained in the above referenced application.

After the P and S bits is located the two-bit POINTER-ID for the element. Following the POINTER-ID is the pointer to the next node. This pointer comprises 16-bits. The first (most significant) bit is known as the TN. If this bit is set, it indicates that the next node is terminal node.

The 15-bits following the TN bit comprise the least significant bits of the next node. As discussed above, 2K of transition nodes may be mapped for parsing applications. If this is done addresses of 0000h through 07FFh are interpreted as NIL-nodes, and pointers with values in this range are NIL-pointers. If a 16 element node (Full Node) is to be addressed, the last two least significant bits of the pointer should be set to zero.

Following the pointer is the 4-bit NODE-TYPE for the next node. A NODE-TYPE of 0000 indicates that the next node is a Full node. If the pointer indicates that the next node is a terminal node or a NIL, the NODE-TYPE bits are irrelevant.

FIGS. 15B2, 15B3 and 15B4 describe the bit representations for the control/extension words and the string words.

Figure 15C:
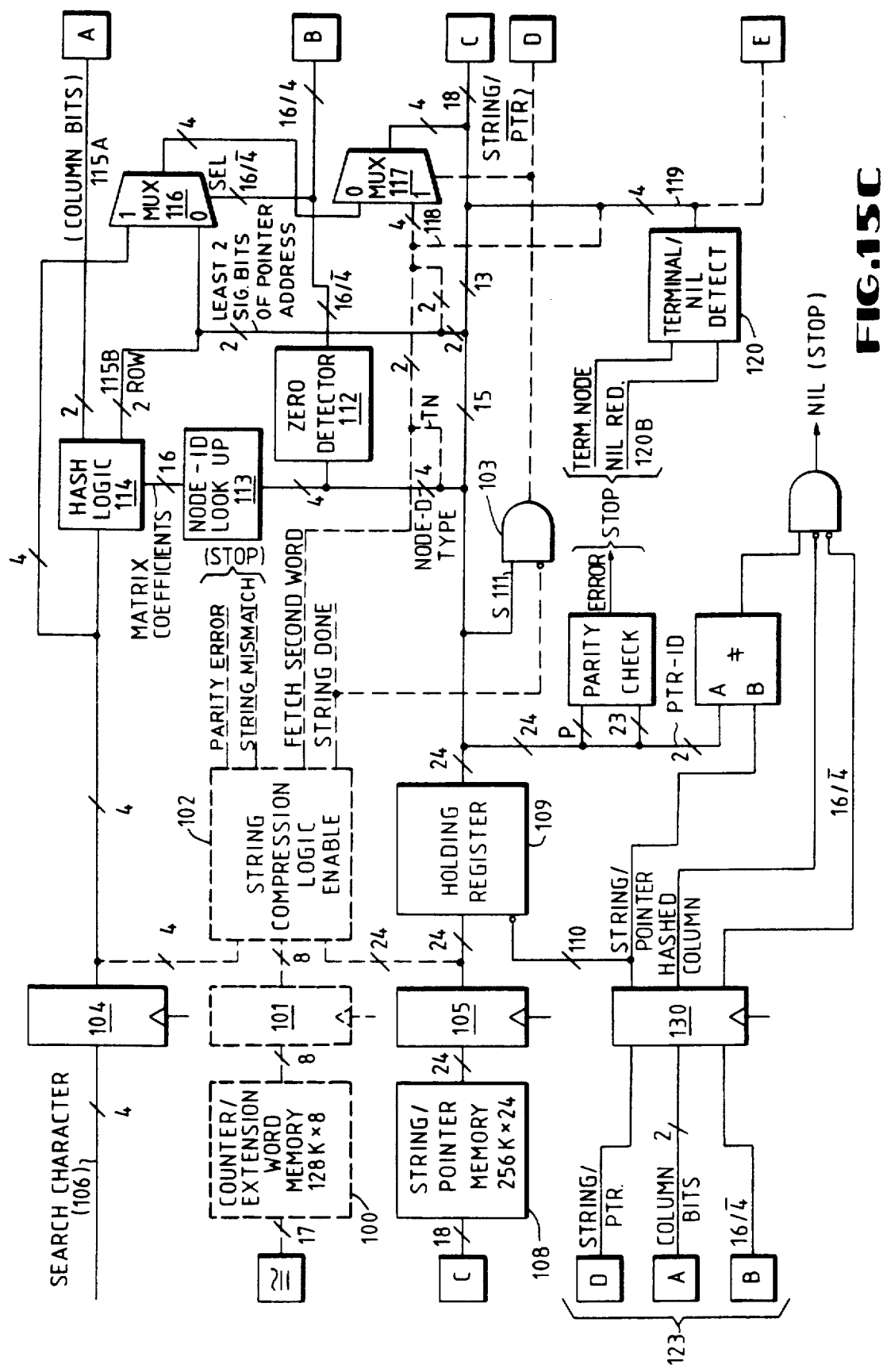
FIG. 15C is a schematic diagram of one embodiment of the present invention.

FIG. 15C is a schematic representation of one embodiment of the present invention.

The counter/extension word memory (100), register (101), String Compression Logic (102), and AND gate (103) are all utilized in path compression. As discussed above, for this illustration it is assumed that each node is a full node or a compressed node with more than one non-NIL elements. As such, AND gate (103) will always produce a 0, indicating that pointers (as opposed to string words) are to be fetched.

Registers (104) and (105) are used to clock in the next pointers and the next character to be searched. The search characters (106) comprise a four bit portion of the data string being searched. As discussed above, each pointer is a 24-bit entity stored in the String/pointer memory (108). Register (105) is used to clock in each pointer at the same time as the search character is clocked in.

The 24-bit pointer signal is applied to String Comparison Logic (102) and the holding register (109). The holding register o is enabled by a signal (110) indicating whether the fetched entity represents a pointer or a string. For the purposes of this illustration, the holding register will always be enabled.

The S-bit of the 21-bit signal (111) is used as an input into AND gate (103). As discussed above, in this example the S-bit will always equal 0.

The 4-bits of the pointer signal representing the NODE-TYPE are applied to both Zero Detector (112) and NODE-TYPE Look-up (113). Zero Detector (112) produces a 1 whenever the NODE-TYPE input equals 0000. Thus when a Full node is to be addressed (i.e., NODE-TYPE=0000) the signal from Zero Detector (112) will be '1' A '0' signal indicates that the next node to be addressed is a compressed node. The output from zero detector (112) is applied as an input to register (130) to serve as an input for the next clock cycle (Block B).

NODE-TYPE Look-up (113) employs conventional logic to convert the 4-bit NODE-TYPE into a 16-bit signal indicative of the translation matrix associated with that NODE-TYPE. Hash Logic (114) performs a hashing operation on the 4-bit search character input. The output from Hash logic (114) includes two column bits (115a) and two row bits (115b). As may be seen, the hashed column bits are applied to register (130) to serve as an input for the next clock cycle. (See block A)

The two row bits (115b) are combined with the two least significant bits of the pointer address to yield a 4-bit input into multiplexer 116. The second input into multiplexer (116) comprises the un-hashed bits of the input search character.

Multiplexer (116) responds to the signal produced by zero detector (112). A '1' from zero detector (112) will cause the unhashed character bits to pass through multiplexer (116). This would be the case if a full node was to be addressed. A '0' from zero detector (112) selects the two row bits along with the two least significant bits of the pointer address. This would be the case if the next node was a compressed node.

The output from multiplexer (116) is feed into a second multiplexer (117). This multiplexer is used to select whether a pointer or a compression string is to be selected next. The output from AND gate (103) is used as the select signal for mux (117). As discussed above, it is assumed for this example that only pointers are to be addressed. As such, the select input to multiplexer (117) will be a '0' and the output from multiplexer (116) will be chosen.

At junction (118) the last two least significant pointer address bits (along with the TN bit and the fetch string word bits) are recombined with the first 13 address bits following the TN bit of the pointer address. Also at this point the TN bit (along with other bits relevant to path compression) is recombined into a 17-bit signal (119). A portion of this signal is applied to terminal/NIL-detector logic (120).

Terminal/NIL-detector logic determines if the next node is a terminal node (i.e., TN='1'). If the next node is a terminal node, a '1' will be produced at output (120a) indicating that the search is completed. A terminal node is a node pointed to by a LEAF pointer. If the pointer address is within the mapped range (i.e., 0000-07FF), terminal logic (120) will produce a signal at output (120b) indicating that there is no match in the database, and that the search should terminate.

The 17-bit signal is also applied to the control/extension memory (100) which is not utilized in the present example.(See block D)

The output from multiplexer (117) is combined with the first thirteen address bits following the TN bit of the pointer address (i.e., the "middle" thirteen significant bits).

As noted above, the output of multiplexer (117) may comprise:

(a) the four character bits [full node next], or
(b) the two row bits and the last two least significant address bits [compressed node next].

This 17-bit signal is combined with the output from AND gate (103) to produce an 18-bit signal (122). The output from gate (103) indicates whether the next address is a pointer address or a string address. As discussed, in this example gate (103) will always output a '0'.

This 18-bit signal (122) is applied to the string/pointer memory (108). This signal used to address the next pointer element in the string/pointer memory (108). (See block C)

The two column bits (115a) from hash logic (115) are combined with the signal from zero detector (112), and gate (103) to produce the four bit signal (123) (blocks D, A, B). This four bit signal indicates: (1) the hashed column value for the next pointer, (2) whether the next address is for a pointer or a string (in this case always a pointer), and (3) whether the next node contains 16 elements or a 4 elements. This signal (123) is applied to register (125).

When control register (125) is clocked, the four-bit signal (123) is allowed to pass through the register (125). The hashed column bits are compared at element (126) with the POINTER-ID bits of the pointer that was clocked in through register (105). If the bits do not match, a NIL pointer is indicated and a STOP signal will be produced at AND gate (127) i the other control bits indicate that a compressed node is being addressed (i.e., signals indicate a 4 node and a pointer).

Figure 15D:
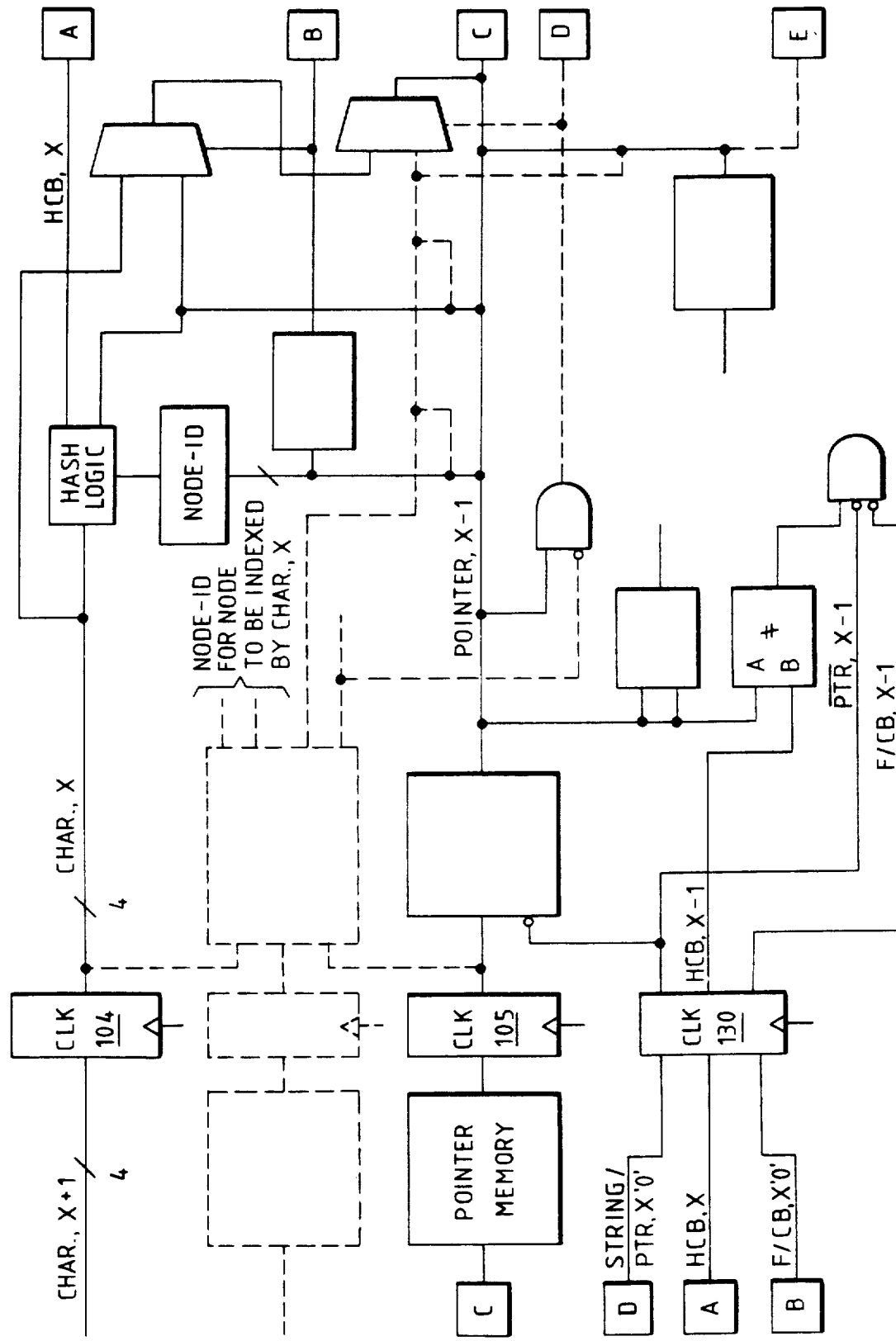
Figure 15E:
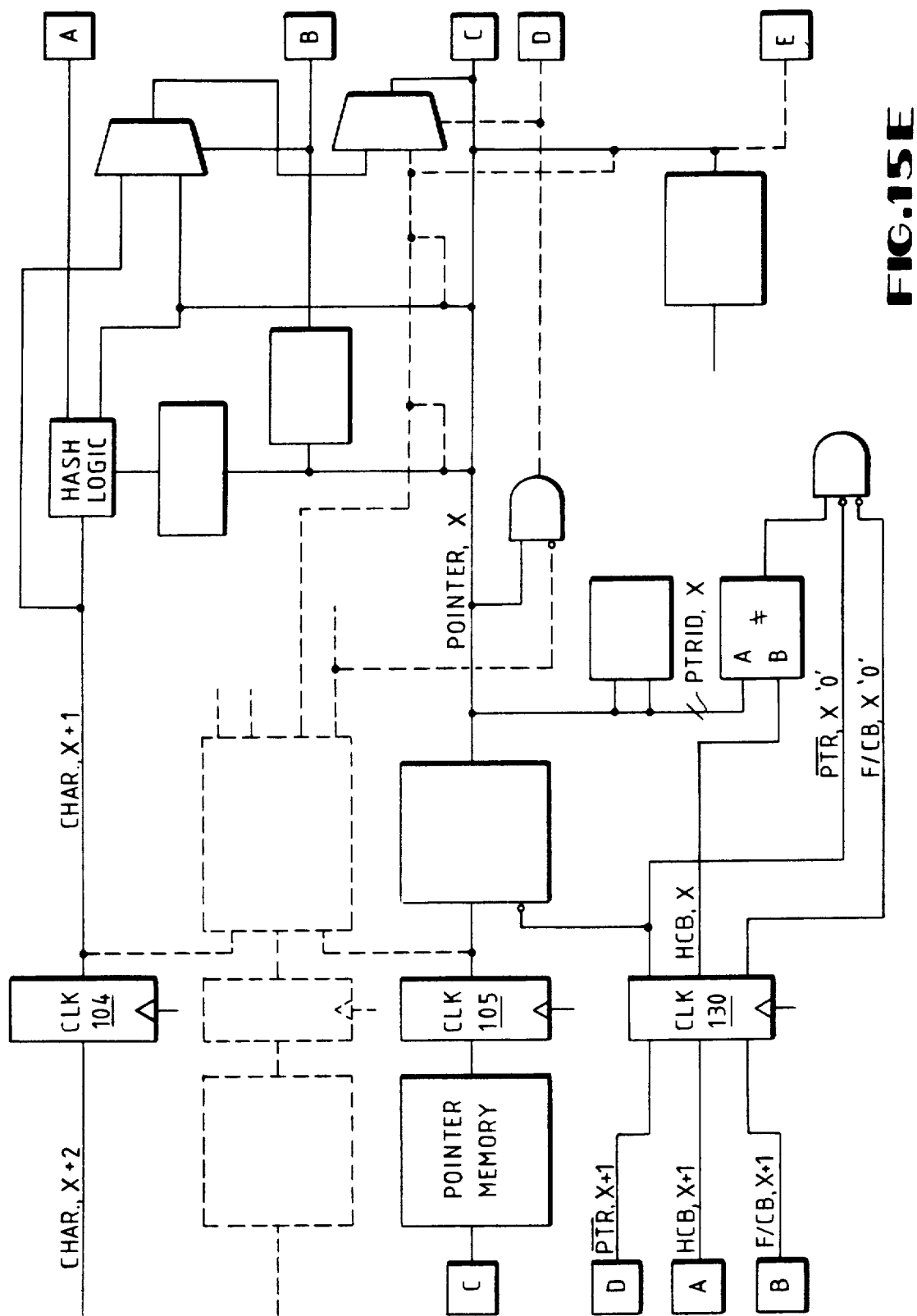

FIG. 15D and 15E illustrate the operation of the above described circuit. For ease of illustration, it is assumed that a search is already underway, and that at the time of FIG. 15D, character X, (Char.X), is the current output of register (104). The output of register (105), Pointer.X−1, is the pointer to the node that Char.X will index into. This pointer is labeled X−1 as it was selected at a previous time by a preceding character and a parent node. For this example, Pointer.X−1 resides in a full node. The output of register (130) includes four bits which include the Full/Compressed bit (F/CB.X−1), which indicates that Pointer.X−1 resides in a full node, and the Hashed column bits (HCB.X−1) indicating the hashed column bits for Char.X−1, and the string/pointer bit which indicates whether the fetched entity is a string or column.

The input to register (104), Char.X+1, represents the search character which will be used as an index into the node pointed to by the element indexed by Char.X.

The input to register (105) is produced by the above described logic in response to Char.X (the current search character), and Pointer.X−1 (the pointer pointing to the node to be indexed by Char.X). As such the input to register (105) represents the address of the node to be indexed by Char.X+1.

The input to register (130) comprises 4-bits including the Full/Compressed Bit ,F/CB.X, which indicates whether the next pointer (pointer.X) will point to a full or compressed node. Another input to register (130) is the two bit representation of the hashed column bits of Char.X, HCB.X.

For the purposes of illustration, it is assumed that Pointer.X−1 indicates that the next node to be addressed is a compressed node. As such, the F/CB.X will be a '0' indicating that the next node is a compressed node. As discussed above, pointer.X−1 includes four bits indicating the NODE-TYPE of the node to be examined by Char.X. In response to this signal, NODE-TYPE look-up (113) and hash logic (114) produce the hashed column bits of Char.X which are input into register (130) for comparison in the next cycle.

When the three registers, are clocked, the signals will be as illustrated in FIGS. 15F1 and 15F2. Register (104) will clock Char.X+1 into the system. Char.X+2 moves up into next position.

Register (105) clocks in the pointer element addressed by Char.X. This pointer is labeled pointer.X. Register (130) clocks in the hashed column bits of Char.X and an indication that pointer.X is located in a compressed node (F/CB.X).

The Pointer.X, clocked in by register (105) includes the POINTER-ID for that particular element. In the same clock cycle, the hashed column bits of Char.X are clocked in through register (130). As such the bits may be compared at comparator (160). If the bits do not match, a signal is generated indicating that the search should terminate.

As may be noticed, pointer.X includes the address for the node to be indexed by Char.X+1, as well as the NODE-TYPE for that node. Thus, the hashing logic may be employed to generate the appropriate column bit for comparison in the next cycle.

By periodically clocking the circuit of FIG. 15 a search of the database may be effected. This search will continue until the Terminal/Nil detector detects a termination point, the POINTER-ID/Column comparator indicates a mismatch, a parity error occurs, the characters of the search object are exhausted, or a string mismatch occurs.

FIGS. 15F1 and 15F2 illustrate the above-described embodiment of the invention with the output and input blocks combined.

While the present invention is concerned with search words divided into 4-bit characters and compressed nodes comprising only 4-elements, it is envisioned that the described method and apparatus may be adapted to operate on string words of different length and compressed nodes of different sizes.

To accommodate such changes, the compressed node sizes must be some power of two. For example, if a compressed node of eight elements is desired, the translation matrix would be eight rows each of two columns. Hence, the POINTER-ID should be reduced to one bit (to indicate column 0 or column 1). For a compressed node of two elements, the translation matrix would be two rows of eight columns. As such, a three bit POINTER-ID would be required.

Translation matrices would have to be developed and assigned a NODE-TYPE to enable all possible arrangements of the two or eight characters to be described. For example, to support two element nodes, only four new translation matrices are required. This would entail NODE-TYPEs of only two bits. Each translation matrix would cover 8*8=64 possible pairings of characters at a two-node. Although there are only 120 possible two character combinations, (16-chose-2 or 16!/(14! * 2)) four translation matrices would be required to compensate for the necessarily high overlap.

To support eight-element nodes would require far more translation matrices. For eight elements there are 12,870 possible character combinations (16-chose-8 or 16!/(8! * 8!)). Each 8×2 translation matrix could cover 2**8=256 possible combinations. Thus the lower bound for eight element translation tables would be 12780/256 or 51. However, since it is impossible to produce truly orthoginal translation matrices, the actual number may be in the range of 60-80 resulting in a need for 7-bit NODE-TYPEs.

Hardware or software configurations could then be developed for each translation matrix using the above described methods.

The two element nodes and the eight element nodes should be implemented only as extensions to a structure having four nodes and sixteen nodes (i.e., the 2 and 8 element nodes should be used only in conjunction with 16 and 4 element nodes). The two and the eight element nodes should be used together. To use the eight-element node without the two-element node (or vice-versa) would provide no benefit in the worst case.

I claim as my invention:

1. In a digital data processing system, a method for compressing a TRIE-node having sixteen pointer elements of which less than five are non-NIL pointer elements, where each pointer element is associated with a unique hexadecimal number 0-$F_h$, the method comprising the steps of:
   (a) selecting a unique 4-bit code for each non-NIL pointer element such that no two 4-bit codes share the same first two bit combination;
   (b) combining each non-NIL pointer element with the second two bits of the respective 4-bit code to yield a compressed pointer element; and
   (c) storing the compressed pointer elements in the order established by the binary values of the first two bits of the respective 4-bit codes to create a compressed TRIE-node.

2. The method of claim 1 wherein the 4-bit codes in step (a) are selected by:
   (a1) generating one or more translation matrices such that each translation matrix is a four-by-four matrix whose elements consist of the sixteen hexadecimal numbers 0-$F_h$;
   (a) selecting one of the generated translation matrices such that each hexadecimal number associated with a non-NIL pointer element is in a distinct row;
   (a) selecting the 4-bit code for each non-NIL pointer element such that the first two bits represent the binary value of the row in the selected matrix where the hexadecimal number corresponding to the non-NIL pointer element is found and where the second two bits represent the binary value of the column of the selected matrix where the hexadecimal number corresponding to the non-NIL pointer element is found.

3. The invention of claim 2 wherein 15 translation matrices are generated.

4. The invention of claim 2 wherein the generated translation matrices are linear.

5. The method of claim 2 wherein a unique digital code identifier is assigned to each of the generated translation matrices and step (c) further includes the step of:
  (c1) storing in a digital memory a representation of the digital code identifier assigned to the selected translation matrix.

6. The invention of claim 5 wherein step (a1) includes generating one or more of the following translation matrices and digital code identifiers:

| DIGITAL CODE IDENTIFIER | TRANSLATION MATRIX | | | |
|---|---|---|---|---|
| 0001 | 0 | 3 | 4 | 7 |
|      | 2 | 1 | 6 | 5 |
|      | 8 | B | C | F |
|      | A | 9 | E | D |
| 0010 | 0 | A | 4 | E |
|      | 1 | B | 5 | F |
|      | 8 | 2 | C | 6 |
|      | 9 | 3 | D | 7 |
| 0011 | 0 | 7 | 8 | F |
|      | 2 | 5 | A | D |
|      | 4 | 3 | C | B |
|      | 6 | 1 | E | 9 |
| 0100 | 0 | 9 | 6 | F |
|      | 4 | D | 2 | B |
|      | 8 | 1 | E | 7 |
|      | C | 5 | A | 3 |
| 0101 | 0 | B | 4 | F |
|      | 2 | 9 | 6 | D |
|      | 8 | 3 | C | 7 |
|      | A | 1 | E | 5 |
| 0110 | 0 | A | C | 6 |
|      | 1 | B | D | 7 |
|      | 8 | 2 | 4 | E |
|      | 9 | 3 | 5 | F |
| 0111 | 0 | 1 | 2 | 3 |
|      | 4 | 5 | 6 | 7 |
|      | 8 | 9 | A | B |
|      | C | D | E | F |
| 1000 | 0 | 1 | 8 | 9 |
|      | 2 | 3 | A | B |
|      | 4 | 5 | C | D |
|      | 6 | 7 | E | F |
| 1001 | 0 | 2 | C | E |
|      | 1 | 3 | D | F |
|      | 4 | 6 | 8 | A |
|      | 5 | 7 | 9 | B |
| 1010 | 0 | 5 | 2 | 7 |
|      | 4 | 1 | 6 | 3 |
|      | 8 | D | A | F |
|      | C | 9 | E | B |
| 1011 | 0 | 1 | C | D |
|      | 2 | 3 | E | F |
|      | 4 | 5 | 8 | 9 |
|      | 6 | 7 | A | B |
| 1100 | 0 | 5 | 8 | D |
|      | 2 | 7 | A | F |
|      | 4 | 1 | C | 9 |
|      | 6 | 3 | E | B |
| 1101 | 0 | 9 | A | 3 |
|      | 4 | D | E | 7 |
|      | 8 | 1 | 2 | B |
|      | C | 5 | 6 | F |
| 1110 | 0 | D | 6 | B |
|      | 4 | 9 | 2 | F |
|      | 8 | 5 | E | 3 |
|      | C | 1 | A | 7 |
| 1111 | 0 | 5 | E | B |

-continued

| DIGITAL CODE IDENTIFIER | TRANSLATION MATRIX | | | |
|---|---|---|---|---|
|      | 4 | 1 | A | F |
|      | 8 | D | 6 | 3 |
|      | C | 9 | 2 | 7 |

7. In a digital processing system, a method of compressing a TRIE-node having sixteen pointer elements for positions represented by the hexadecimal characters $0_h$ through $F_h$ respectively, of which less than five of said pointer elements are non-NIL pointer elements, said method comprising the steps of:
  (a) generating fifteen linear translation matrices having matrix values of $0_h$ through $E_h$, respectively such that each translation matrix is a four-by-four matrix whose elements include all of the sixteen hexadecimal characters;
  (b) selecting one of the generated translation matrices such that each hexadecimal character representing the position of a non-NIL pointer element is in a distinct row;
  (c) assigning a 4-bit code to each hexadecimal character assigned to a non-NIL pointer element such that the first two bits represent the binary value of the row, and the second two bits represent the binary value of the column, of the position in the selected translation matrix where the hexadecimal character is found.
  (d) ordering the non-NIL pointer elements according to the binary values of the first two bits of their respective 4-bit codes;
  (e) combining each non-NIL pointer element with the second two bits of the 4-bit code assigned to its associated hexadecimal character to yield a compressed pointer element; and
  (f) storing the compressed pointer elements in the order established in step (e), thus creating a compressed node; and
  (g) storing in a digital memory the matrix value of the selected translation matrix.

8. A method for terminating the search of a computerized database having compressed TRIE-nodes with one or more elements, each element including an element identifier, given a search character and a node address, where each TRIE-node may be one of several node types, the method comprising the steps of:
  (a) receiving the node address, where the node address indicates the node to be searched and the node type of the node to be searched;
  (b) receiving the search character to be searched at the node referenced by the node address;
  (c) generating a hashed value in response to the search character and the node type of the node to be searched, where the hashed value comprises a first portion and a second portion;
  (d) generating a element address on the basis of the address of the node to be searched and the first portion of the hashed value;
  (e) selecting a pointer element in response to the element address;
  (f) comparing the element identifier of the selected element with the second portion of the hashed value and terminating the search if the element identifier and the second portion do not match.

9. Apparatus for terminating the search of a TRIE-structured database having a compressed node given an input search character and a bit field having a value representing the compressed node; the compressed node containing node elements having both a pointer and a pointer identifier, the apparatus comprising:

(a) first logic means responsive to the bit field representing the compressed node for generating a translation bit-field for the node;

(b) second logic means connected to the first logic means and responsive to both the translation bit-field and the input search character for generating a translated address; the translated address comprising a first part indicating the address of an element in the compressed node and a second part corresponding to the search character;

(c) addressing means connected to the second logic means for receiving the translated address and addressing the node element indicated by the first part of the translated address; and (d) comparison means connected to the second logic means and the addressing means for comparing the second part of the translated address with the pointer identifier portion of the node element addressed by the addressing means; the comparison means generating a signal to terminate the search if the second part of the translated address does not match the pointer identifier portion.

* * * * *

UNITED STATES PATENT AND TRADEMARK OFFICE
CERTIFICATE OF CORRECTION

PATENT NO. : 5,276,868
DATED : Jan. 4, 1994
INVENTOR(S) : Nigel T. Poole

It is certified that error appears in the above-indentified patent and that said Letters Patent is hereby corrected as shown below:

Column 3, line 19, delete "mode" and insert, -- node --.

Column 14, line 16, delete "o" after the word look-up.

Column 16, line 35, insert after the word node --contains four such pointers. The first two bits P and S are a --.

Column 17, line 17, delete "o" after the word register.

Column 17, line 30, insert --. -- after '1'.

Column 18, line 52, delete "i", and insert --if--.

Column 20, line 14, delete "2))", and insert --2!))--.

Signed and Sealed this

Nineteenth Day of July, 1994

Attest:

BRUCE LEHMAN

*Attesting Officer*  *Commissioner of Patents and Trademarks*